United States Patent
Arai et al.

(10) Patent No.: US 11,643,712 B2
(45) Date of Patent: May 9, 2023

(54) STEEL PIPE AND METHOD FOR PRODUCING STEEL PIPE

(71) Applicant: NIPPON STEEL CORPORATION, Tokyo (JP)

(72) Inventors: Yuji Arai, Tokyo (JP); Shinji Yoshida, Tokyo (JP); Atsushi Soma, Tokyo (JP); Hiroki Kamitani, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 242 days.

(21) Appl. No.: 17/043,306

(22) PCT Filed: Mar. 22, 2019

(86) PCT No.: PCT/JP2019/011975
§ 371 (c)(1),
(2) Date: Sep. 29, 2020

(87) PCT Pub. No.: WO2019/198460
PCT Pub. Date: Oct. 17, 2019

(65) Prior Publication Data
US 2021/0032734 A1 Feb. 4, 2021

(30) Foreign Application Priority Data

Apr. 9, 2018 (JP) .............................. JP2018-075057

(51) Int. Cl.
C22C 38/02 (2006.01)
C22C 38/04 (2006.01)
(Continued)

(52) U.S. Cl.
CPC ................ C22C 38/54 (2013.01); C21D 8/10 (2013.01); C21D 9/08 (2013.01); C22C 38/001 (2013.01);
(Continued)

(58) Field of Classification Search
CPC ......... C22C 38/02; C22C 38/04; C22C 38/06; C22C 38/18; F16L 9/02; F16L 9/165; F16L 9/17–22
See application file for complete search history.

(56) References Cited

U.S. PATENT DOCUMENTS

| 2007/0137736 A1 | 6/2007 | Omura et al. |
| 2011/0315276 A1 | 12/2011 | Bosch et al. |
| 2015/0114525 A1* | 4/2015 | Valls Angles ........... C22C 38/46 148/612 |

FOREIGN PATENT DOCUMENTS

| JP | 59232220 A | 12/1984 |
| JP | 62253720 A | 11/1987 |

(Continued)

*Primary Examiner* — Adam Krupicka
(74) *Attorney, Agent, or Firm* — Greer, Burns & Crain, Ltd.

(57) ABSTRACT

The steel pipe according to the present disclosure contains a chemical composition consisting of, in mass %, C: more than 0.50 to 0.65%, Si: 0.05 to 0.50%, Mn: 0.05 to 1.00%, P: 0.025% or less, S: 0.0050% or less, Al: 0.005 to 0.100%, Cr: 0.30 to 1.50%, Mo: 0.25 to 3.00%, Ti: 0.002 to 0.050%, N: 0.0010 to 0.0100% and O: 0.0030% or less, with the balance being Fe and impurities. The steel pipe contains an amount of dissolved C within a range of 0.010 to 0.060 mass %. The tensile yield strength in the axial direction and the circumferential direction is 862 to 1069 MPa, and the yield ratio in the axial direction is 90% or more. The tensile yield strength in the circumferential direction is 30 to 80 MPa higher than the compressive yield strength in the circumferential direction.

10 Claims, 3 Drawing Sheets

(51) Int. Cl.
*C22C 38/06* (2006.01)
*F16L 9/02* (2006.01)
*C22C 38/54* (2006.01)
*C21D 8/10* (2006.01)
*C21D 9/08* (2006.01)
*C22C 38/00* (2006.01)
*C22C 38/42* (2006.01)
*C22C 38/44* (2006.01)
*C22C 38/46* (2006.01)
*C22C 38/48* (2006.01)
*C22C 38/50* (2006.01)
*C22C 38/52* (2006.01)

(52) U.S. Cl.
CPC ............ *C22C 38/002* (2013.01); *C22C 38/02* (2013.01); *C22C 38/04* (2013.01); *C22C 38/06* (2013.01); *C22C 38/42* (2013.01); *C22C 38/44* (2013.01); *C22C 38/46* (2013.01); *C22C 38/48* (2013.01); *C22C 38/50* (2013.01); *C22C 38/52* (2013.01); *F16L 9/02* (2013.01)

(56) References Cited

FOREIGN PATENT DOCUMENTS

| | | | |
|---|---|---|---|
| JP | 06322478 A | 11/1994 | |
| JP | 08311551 A | 11/1996 | |
| JP | 2000256783 A | 9/2000 | |
| JP | 2000297344 A | 10/2000 | |
| JP | 2005350754 A | 12/2005 | |
| JP | 2012026030 A | 2/2012 | |
| JP | 2012519238 A | 8/2012 | |

* cited by examiner

STEEL PIPE AND METHOD FOR PRODUCING STEEL PIPE

This is a National Phase Application filed under 35 U.S.C. § 371, of International Application No. PCT/JP2019/011975, filed Mar. 22, 2019, the contents of which are incorporated by reference.

TECHNICAL FIELD

The present invention relates to a steel pipe and a method for producing the steel pipe, and more particularly relates to a steel pipe suitable for use in a sour environment, and a method for producing the steel pipe.

BACKGROUND ART

Due to the deepening of oil wells and gas wells (hereunder, oil wells and gas wells are collectively referred to as "oil wells"), there is a demand to enhance the strength of oil-well steel pipes. Specifically, 80 ksi grade (yield strength is 80 to less than 95 ksi, that is, 552 to less than 655 MPa) and 95 ksi grade (yield strength is 95 to less than 110 ksi, that is, 655 to less than 758 MPa) oil-well steel pipes are being widely utilized, and recently requests are also starting to be made for 110 ksi grade (yield strength is 110 to less than 125 ksi, that is, 758 to less than 862 MPa), 125 ksi grade (yield strength is 125 to less than 140 ksi, that is, 862 to less than 965 MPa) and 140 ksi grade (yield strength is 140 to 155 ksi, that is, 965 to 1069 MPa) oil-well steel pipes. Note that in the present description, the term simply referred to as "yield strength" means a tensile yield strength in an axial direction of a steel pipe.

Most deep wells are in a sour environment containing corrosive hydrogen sulfide. In the present description, the term "sour environment" means an environment which contains hydrogen sulfide and is acidified. Note that a sour environment may contain carbon dioxide. Oil-well steel pipes for use in such sour environments are required to have not only high strength, but to also have sulfide stress cracking resistance (hereunder, referred to as "SSC resistance").

Technology for enhancing the SSC resistance of steel pipes as typified by oil-well steel pipes is disclosed in Japanese Patent Application Publication No. 62-253720 (Patent Literature 1), Japanese Patent Application Publication No. 59-232220 (Patent Literature 2), Japanese Patent Application Publication No. 6-322478 (Patent Literature 3), Japanese Patent Application Publication No. 8-311551 (Patent Literature 4), Japanese Patent Application Publication No. 2000-256783 (Patent Literature 5), Japanese Patent Application Publication No. 2000-297344 (Patent Literature 6), Japanese Patent Application Publication No. 2005-350754 (Patent Literature 7), National Publication of International Patent Application No. 2012-519238 (Patent Literature 8) and Japanese Patent Application Publication No. 2012-26030 (Patent Literature 9).

Patent Literature 1 proposes a method for improving the SSC resistance of steel for oil wells by reducing impurities such as Mn and P. Patent Literature 2 proposes a method for improving the SSC resistance of steel by performing quenching twice to refine the grains.

Patent Literature 3 proposes a method for improving the SSC resistance of a 125 ksi grade steel material by refining the steel microstructure by a heat treatment using induction heating. Patent Literature 4 proposes a method for improving the SSC resistance of steel pipes of 110 to 140 ksi grade by enhancing the hardenability of the steel by utilizing a direct quenching process and also increasing the tempering temperature.

Patent Literature 5 and Patent Literature 6 each propose a method for improving the SSC resistance of a steel for low-alloy oil country tubular goods of 110 to 140 ksi grade by controlling the shapes of carbides. Patent Literature 7 proposes a method for improving the SSC resistance of steel materials of 125 ksi grade or higher by controlling the dislocation density and the hydrogen diffusion coefficient to desired values.

Patent Literature 8 proposes a method for improving the SSC resistance of steel of 125 ksi grade by subjecting a low-alloy steel containing 0.3 to 0.5% of C to quenching multiple times. Patent Literature 9 proposes a method for controlling the shapes or number of carbides by employing a tempering process composed of a two-stage heat treatment. More specifically, in Patent Literature 9, a method is proposed that enhances the SSC resistance of 125 ksi grade steel by suppressing the number density of large $M_3C$ particles or $M_2C$ particles.

CITATION LIST

Patent Literature

Patent Literature 1: Japanese Patent Application Publication No. 62-253720
Patent Literature 2: Japanese Patent Application Publication No. 59-232220
Patent Literature 3: Japanese Patent Application Publication No. 6-322478
Patent Literature 4: Japanese Patent Application Publication No. 8-311551
Patent Literature 5: Japanese Patent Application Publication No. 2000-256783
Patent Literature 6: Japanese Patent Application Publication No. 2000-297344
Patent Literature 7: Japanese Patent Application Publication No. 2005-350754
Patent Literature 8: National Publication of International Patent Application No. 2012-519238
Patent Literature 9: Japanese Patent Application Publication No. 2012-26030

SUMMARY OF INVENTION

Technical Problem

However, in the case of a steel pipe (for example, an oil-well steel pipe) having a yield strength in a range of 862 to 1069 MPa (125 to 155 ksi, that is, 125 ksi grade or 140 ksi grade), excellent SSC resistance may not be obtained stably even if the techniques disclosed in Patent Literatures 1 to 9 are applied.

An objective of the present disclosure is to provide a steel pipe and a method for producing the steel pipe that has a yield strength within a range of 862 to 1069 MPa (125 to 155 ksi, that is, 125 ksi grade or 140 ksi grade) and excellent SSC resistance.

Solution to Problem

The steel pipe according to the present disclosure contains a chemical composition consisting of, in mass %, C: more than 0.50 to 0.65%, Si: 0.05 to 0.50%, Mn: 0.05 to 1.00%, P: 0.025% or less, S: 0.0050% or less, Al: 0.005 to 0.100%, Cr: 0.30 to 1.50%, Mo: 0.25 to 3.00%, Ti: 0.002 to 0.050%, N: 0.0010 to 0.0100%, O: 0.0030% or less. V: 0 to 0.300%, Nb: 0 to 0.100%, B: 0 to 0.0030%, Ca: 0 to 0.0100%, Mg: 0 to 0.0100%, Zr: 0 to 0.0100%, Co: 0 to 1.00%, W: 0 to 1.00%, Ni: 0 to 0.50%, and Cu: 0 to 0.50%, with the balance being Fe and impurities. The steel pipe according to the present disclosure contains 0.010 to 0.060 mass % of dissolved C. The steel pipe according to the present disclosure has a tensile yield strength in an axial direction of steel pipe in a range of 862 to 1069 MPa, and a yield ratio in an axial direction of steel pipe is 90% or more. The steel pipe according to the present disclosure has a tensile yield strength in a circumferential direction of steel pipe in a range of 862 to 1069 MPa. and the tensile yield strength in a circumferential direction of steel pipe is 30 to 80 MPa higher than a compressive yield strength in a circumferential direction of steel pipe.

A method for producing a steel pipe according to the present disclosure includes a preparation process, a quenching process, a tempering process, a hot straightening process, a hollow shell temperature adjustment process, and a rapid cooling process. In the preparation process, a hollow shell containing the above described chemical composition is prepared. In the quenching process, after the preparation process, the hollow shell that is at 800 to 1000° C. is cooled at a cooling rate of 120° C./min or more. In the tempering process, the hollow shell after the quenching process is held at a tempering temperature of 670° C. to an $A_{c1}$ point for 10 to 180 minutes. In the hot straightening process, the hollow shell after the tempering process is subjected to hot straightening at a temperature of 600° C. to the tempering temperature. In the hollow shell temperature adjustment process, the temperature of the hollow shell is maintained in a range from the temperature of the hollow shell at the time of completion of the hot straightening to 500° C. for 10 to 120 seconds after the completion of the hot straightening. In the rapid cooling process, the hollow shell after the hollow shell temperature adjustment process is cooled at a cooling rate of 5 to 100° C./sec in a temperature range of the hollow shell of 500 to 200° C.

Advantageous Effects of Invention

The steel pipe according to the present disclosure has a yield strength in a range of 862 to 1069 MPa (125 to 155 ksi, that is, 125 ksi grade or 140 ksi grade), and also has excellent SSC resistance. The method for producing a steel pipe according to the present disclosure can produce the above described steel pipe.

DESCRIPTION OF EMBODIMENTS

Figure 1:
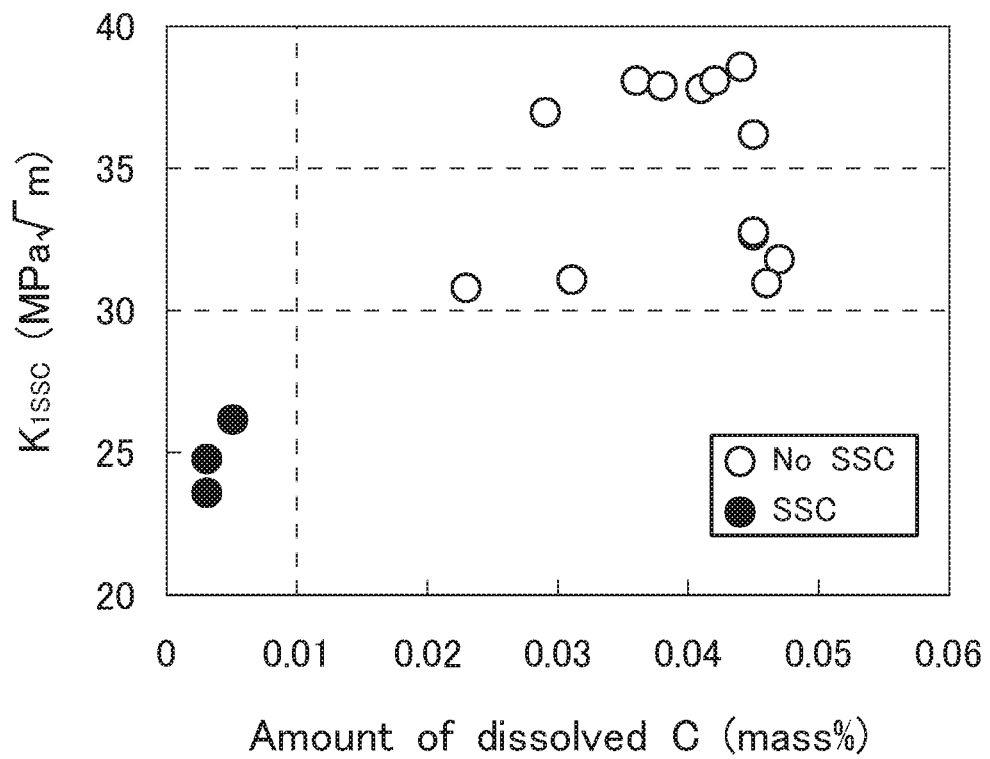
FIG. 1 is a view illustrating the relation between the amount of dissolved C and the SSC resistance.

The present inventors conducted investigations and studies regarding a method for obtaining both a yield strength in a range of 862 to 1069 MPa (125 to 155 ksi, that is, 125 ksi grade or 140 ksi grade) and SSC resistance in a steel pipe that it is assumed will be used in a sour environment, and obtained the following findings.

If the dislocation density of a steel pipe is increased, the yield strength of the steel pipe will increase. However, there is possibility that dislocations will occlude hydrogen. Therefore, if the dislocation density in a steel pipe increases, there is a possibility that the amount of hydrogen that the steel pipe occludes will also increase. If the hydrogen concentration in the steel pipe increases as a result of increasing the dislocation density, even if high strength is obtained, the SSC resistance of the steel pipe will decrease. Accordingly, at first glance it seems that, in order to obtain both a yield strength of 125 ksi grade or higher and excellent SSC resistance, utilizing the dislocation density to enhance the strength is not preferable.

However, the present inventors discovered that by adjusting the amount of dissolved C in a steel pipe, excellent SSC resistance can be further obtained while at the same time raising the yield strength to 125 ksi grade or higher by utilizing the dislocation density. Although the reason is not certain, it is considered that the reason may be as follows.

Dislocations include mobile dislocations and sessile dislocations, and it is considered that dissolved C in a steel pipe immobilizes mobile dislocations to thereby form sessile dislocations. When mobile dislocations are immobilized by dissolved C, the disappearance of dislocations can be inhibited, and thus a decrease in the dislocation density can be suppressed. In this case, the yield strength of the steel pipe can be maintained.

In addition, it is considered that the sessile dislocations that are formed by dissolved C reduce the amount of hydrogen that is occluded in the steel pipe more than mobile dislocations. Therefore, it is considered that by increasing the density of sessile dislocations that are formed by dissolved C, the amount of hydrogen that is occluded in the steel pipe is reduced. As a result, the SSC resistance of the steel pipe can be increased. It is considered that because of this mechanism, a steel pipe in which sessile dislocations are formed by dissolved C can obtain excellent SSC resistance even if it has a yield strength of 125 ksi grade or higher.

As described so far, the present inventors considered that appropriately adjusting the amount of dissolved C in a steel pipe, the SSC resistance of the steel pipe can be increased while maintaining a yield strength of 125 ksi grade or higher by utilizing dislocation density. Therefore, using a steel pipe containing a chemical composition consisting of, in mass %, C: more than 0.50 to 0.65%, Si: 0.05 to 0.50%, Mn: 0.05 to 1.00%, P: 0.025% or less, S: 0.0050% or less, Al: 0.005 to 0.100%. Cr: 0.30 to 1.50%, Mo: 0.25 to 3.00%, Ti: 0.002 to 0.050%, N: 0.0010 to 0.0100%, O: 0.0030% or less, V: 0 to 0.300%. Nb: 0 to 0.100%, B: 0 to 0.0030%, Ca: 0 to 0.0100%, Mg: 0 to 0.0100%, Zr: 0 to 0.0100%, Co: 0 to 1.00%, W: 0 to 1.00%, Ni: 0 to 0.50%, and Cu: 0 to 0.50%, with the balance being Fe and impurities, the present inventors investigated the relation between the amount of dissolved C, the yield strength, and the SSC resistance.

[Relation Between Amount of Dissolved C and SSC Resistance]

FIG. 1 is a view illustrating the relation between the amount of dissolved C and the SSC resistance. FIG. 1 was obtained by the following method. FIG. 1 was created using the amount of dissolved C (mass %), evaluation results of a constant load tensile test to be described later, and fracture toughness values $K_{ISSC}$ (MPa√m) obtained by a DCB test to be described later, obtained with respect to steel pipes for which, among the steel pipes of examples that are described later, conditions other than the amount of dissolved C satisfied the range of the present embodiment.

The yield strength of the steel pipes shown in FIG. 1 was within a range of 862 to 1069 MPa (125 to 155 ksi, that is, 125 ksi grade or 140 ksi grade). Adjustment of the yield strength was performed by adjusting the tempering temperature. Further, with respect to the SSC resistance, when a fracture toughness value $K_{ISSC}$ obtained by the DCB test was 30.0 MPa√m or more, it was determined that the result of the DCB test was good. Note that the symbol "○" in FIG. 1 shows a steel pipe for which the result of the constant load tensile test was good. On the other hand, the symbol "●" in FIG. 1 shows a steel pipe for which the result of the constant load tensile test was not good.

Referring to FIG. 1, when the amount of dissolved C was 0.010 mass % or more in a case in which the yield strength was adjusted to be 125 ksi grade or 140 ksi grade, the fracture toughness value $K_{ISSC}$ was 30.0 MPa√m or more, and further, results of the constant load tensile test were good as well. That is, when the amount of dissolved C was 0.010 mass % or more, the steel pipe exhibited excellent SSC resistance.

Referring to FIG. 1 further, within the ranges of the chemical composition and the mechanical properties (yield strength (125 ksi grade or 140 ksi grade) and yield strength in circumferential direction to be described later) of the present embodiment, when the amount of dissolved C is 0.060 mass % or less, a steel pipe having excellent SSC resistance can be obtained. Therefore, in the steel pipe according to the present embodiment, the amount of dissolved C is set to 0.010 to 0.060 mass %.

[Straightening after Tempering]

By the way, when a steel pipe which is supposed to be used in a sour environment is produced, quenching and tempering are performed. In the present description, the term "quenching" means rapidly cooling a steel pipe (or a hollow shell) which has been heated to a temperature not less than the $A_3$ point. Note that rapid cooling is, for example, oil cooling and water cooling. In the present description, the term "tempering" means reheating and holding a steel pipe (or a hollow shell) after quenching at a temperature less than the $A_{c1}$ point.

Here, the final product of the steel pipe is required in some cases to have straightness in an axial direction of steel pipe, and/or roundness of a sectional shape of steel pipe. Therefore, when the steel pipe is bent at the time of quenching, and/or the sectional shape of the steel pipe is deformed (for example, into an eclipse, etc.), the steel pipe after tempering is subjected to straightening. Here, a type of the straightening machine for performing the straightening is not particularly limited, and any known straightening machine may be used. The straightening machine may be, for example, an inclined-roll type straightening machine (for example, a rotary straightener, etc.), or a rotary housing type straightening machine. Note that upon straightening a steel pipe to be used in a sour environment, the steel pipe is straightened in a warm condition (for example, 400° C. to 700° C.). This is because when a steel pipe is subjected to cold straightening (for example, at normal temperature), the dislocation density excessively increases, and the SSC resistance of the steel pipe will extremely deteriorate.

To stably improve the SSC resistance of a steel pipe subjected to straightening in such a warm condition (hereinafter, simply referred to as "hot straightening"), the present inventors verified whether or not there was difference in the SSC resistance between a steel pipe which had been subjected to hot straightening after quenching and tempering, and a steel pipe which had not been subjected to hot straightening after quenching and tempering. As a result, it was found that the SSC resistance of the steel pipe subjected to hot straightening might decrease.

Specifically, the present inventors conducted two kinds of SSC resistance tests (a DCB test in accordance with NACE TM0177-2005 Method D, and a constant load tensile test in accordance with NACE TM0177-2005 Method A) for a steel pipe which had been subjected to hot straightening after quenching and tempering, and a steel pipe which had not been subjected to hot straightening after quenching and tempering. As a result, as shown in Table 1, both the steel pipe which had been subjected to hot straightening and the steel pipe which had not been subjected to hot straightening exhibited excellent SSC resistance (as denoted by "E": Excellent in Table 1) in the DCB test. On the other hand, in the constant load tensile test, the steel pipe which had not been subjected to hot straightening exhibited excellent SSC resistance (denoted by "E" in Table 1), while the steel pipe which had been subjected to hot straightening did not exhibit excellent SSC resistance (denoted by "NA": Not Acceptable in Table 1).

TABLE 1

|  | DCB test | Constant load tensile test |
| --- | --- | --- |
| Without hot straightening | E | E |
| With hot straightening | E | NA |

Accordingly, the present inventors further studied the relation between the hot straightening and the SSC resistance. As a result, the following findings have been obtained.

As so far described, the amount of dislocation introduced into a steel pipe is smaller in the hot straightening compared with in the cold straightening. However, even in the hot straightening, a certain amount of dislocations is introduced into the steel pipe which has been subjected to straightening compared with into the steel pipe which has not been subjected to straightening. That is, a steel pipe which has been subjected to hot straightening after quenching and tempering may have a higher dislocation density compared with a steel pipe which has not been subjected to hot straightening after quenching and tempering. As described above, a dislocation may occlude hydrogen. Therefore, if the dislocation density in a steel pipe increases, the SSC resistance of the steel pipe may decrease. That is, if the dislocation density in a steel pipe increases due to hot straightening performed after quenching and tempering, the SSC resistance of the steel pipe may decrease.

However, if the SSC resistance of steel pipe has decreased simply because of increase in the dislocation density due to hot straightening, it seems that the steel pipe which has been subjected to hot straightening does not exhibit excellent SSC resistance not only in the constant load tensile test but also in the DCB test. That is, it is considered that the reason why the steel pipe which had been subjected to hot straightening after quenching and tempering exhibited excellent SSC resistance in the DCB test, and on the other hand, did not exhibit excellent SSC resistance in the constant load tensile test was not solely due to the fact that the dislocation density of the steel pipe increased by the hot straightening.

Here, the SSC resistance test is conducted with stress being loaded on a test specimen. The constant load tensile test among the SSC resistance tests is conducted in accordance with NACE TM0177-2005 Method A. Specifically, the constant load tensile test is conducted on a test specimen taken from a steel pipe with tensile stress being loaded in the axial direction of the steel pipe. On the other hand, the DCB test is conducted in accordance with NACE TM0177-2005 Method D. Specifically, the DCB test is conducted on a test specimen taken from a steel pipe with stress being loaded in a direction perpendicular to the axial direction of the steel pipe and also perpendicular to the radial direction of the steel pipe by a wedge driven into the test specimen. That is, there is difference in the direction of stress loaded to the test specimen between the constant load tensile test and the DCB test.

From this, the present inventors considered that the reason why a steel pipe which had been subjected to hot straightening after quenching and tempering exhibited excellent SSC resistance in the DCB test results, but did not exhibit excellent SSC resistance in the constant load tensile test was that anisotropy was generated in the mechanical property of the steel pipe due to the hot straightening after quenching and tempering. Accordingly, the present inventors have studied in detail on tensile yield strength and compressive yield strength in the circumferential direction of steel pipe after quenching and tempering.

Specifically, the present inventors subjected steels containing chemical compositions shown in Table 2 to hot rolling to produce a hollow shell (seamless steel pipe) having an outer diameter of 340 mm and a wall thickness of 13 mm.

TABLE 2

| Chemical composition (in the unit of mass %, the balance being Fe and impurities) | | | | | | | | | | | | |
|---|---|---|---|---|---|---|---|---|---|---|---|---|
| C | Si | Mn | P | S | Al | Cr | Mo | Ti | N | O | V | Nb |
| 0.52 | 0.30 | 0.42 | 0.009 | 0.0006 | 0.030 | 0.65 | 1.65 | 0.008 | 0.0033 | 0.0015 | 0.10 | 0.011 |

A hollow shell after hot rolling was allowed to cool so that the temperature of the hollow shell was at normal temperature. Next, the hollow shell was subjected to quenching in which it was heated to 900° C. for 30 minutes and thereafter rapidly cooled. The hollow shell after quenching was further subjected to tempering in which it was held at 680° C. for 60 minutes. Next, the test was conducted at three conditions by changing presence or absence of hot straightening and temperature conditions of the hollow shell after hot straightening. Test Number 1 was not subjected to hot straightening. Test Numbers 2 and 3 were subjected to hot straightening. Note that hot straightening start temperature in the hot straightening was 600° C. Thereafter, the hollow shell of each test number was cooled at a cooling rate of 20° C./sec. Further, for Test Numbers 2 and 3, the time until the cooling was started after the hot straightening was completed (elapsed time after straightening and before cooling) was as shown in Table 3.

TABLE 3

| Test Number | Elapsed time after straightening and before cooling (sec) | YS (MPa) | TS (MPa) | YR (%) | Circumferential tensile YS (MPa) | Circumferential compressive YS (MPa) | Tensile YS - compressive YS (MPa) | Amount of dissolved C (mass %) | SSC resistance Constant load tensile test | $K_{ISSC}$ (MPa√m) 1 | 2 | 3 | Average value |
|---|---|---|---|---|---|---|---|---|---|---|---|---|---|
| 1 | — | 1005 | 1047 | 95 | 1000 | 995 | 5 | 0.040 | E | 32.3 | 31.3 | 32.1 | 31.9 |
| 2 | 3 | 1000 | 1045 | 96 | 963 | 860 | 103 | 0.035 | NA | 30.2 | 30.7 | 31.9 | 30.9 |
| 3 | 100 | 1007 | 1049 | 96 | 1015 | 980 | 35 | 0.035 | E | 31.0 | 30.3 | 31.2 | 30.8 |

After cooling, tensile test in axial direction was conducted on a steel pipe of each test number based on the test method to be described later. Tensile yield strength (YS (MPa)) in axial direction, tensile strength (TS (MPa)) in axial direction, and yield ratio (YR (%)) in axial direction of the steel pipe of each test number are shown in Table 3. Here, in the present description, the tensile yield strength in the axial direction means the 0.2% offset proof stress obtained in the tensile test in axial direction.

Further, based on the test method to be described later, the steel pipe of each test number was subjected to a tensile test in circumferential direction and a compression test in circumferential direction. A tensile yield strength in circumferential direction (circumferential tensile YS (MPa)), a compressive yield strength in circumferential direction (circumferential compressive YS (MPa)), and difference between the tensile yield strength in circumferential direction and the compressive yield strength in circumferential direction (tensile YS−compressive YS (MPa)), of a steel pipe of each test number are shown in Table 3.

Here, the term "circumferential direction of steel pipe" in the present description means a direction perpendicular to the axial direction of steel pipe and also perpendicular to the radial direction of steel pipe at any position of a steel pipe. That is, in the present description, a tensile yield strength in the circumferential direction of steel pipe means the 0.2% offset proof stress obtained by a tensile test in a direction perpendicular to the axial direction of a steel pipe and also perpendicular to the radial direction of the steel pipe at an arbitrary point of the steel pipe. In the present description, the circumferential compressive yield strength of a steel pipe means the 0.2% offset proof stress obtained by compression test in a direction perpendicular to the axial direction of the steel pipe and also perpendicular to radial direction of the steel pipe at an arbitrary point of the steel pipe.

Note that the above described "arbitrary point" is preferably a center portion of the wall thickness of a steel pipe, although the position in the wall thickness direction of the steel pipe is not particularly limited. However, when a test specimen to be described later cannot be taken from a center portion of the wall thickness, the "arbitrary point" may be near the inner surface of the steel pipe.

Figure 2A:
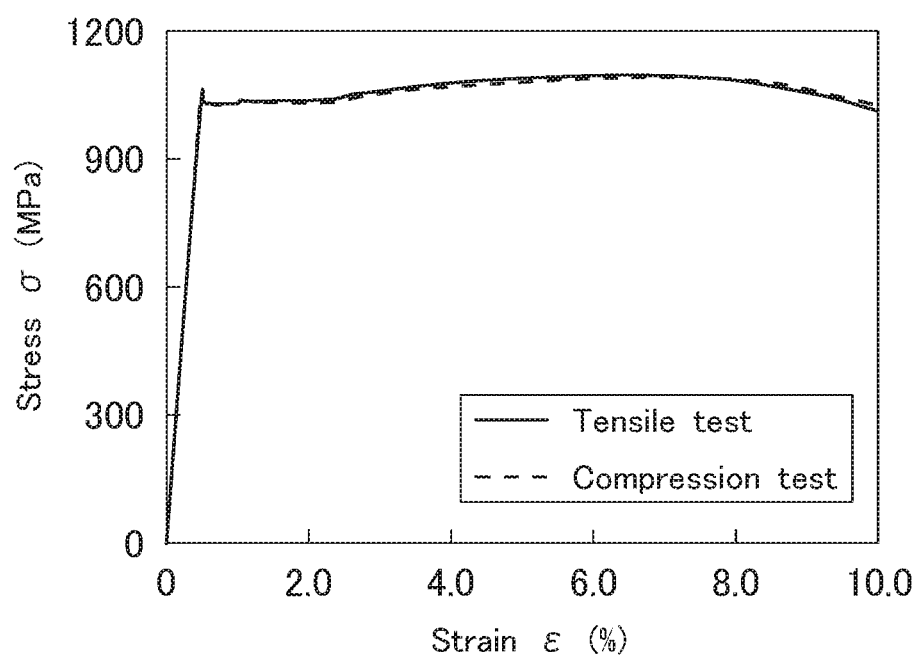
FIG. 2A shows a tensile stress-strain curve and a compressive stress-strain curve in a circumferential direction of steel pipe in a case in which hot straightening is not performed after quenching and tempering.
Figure 2B:
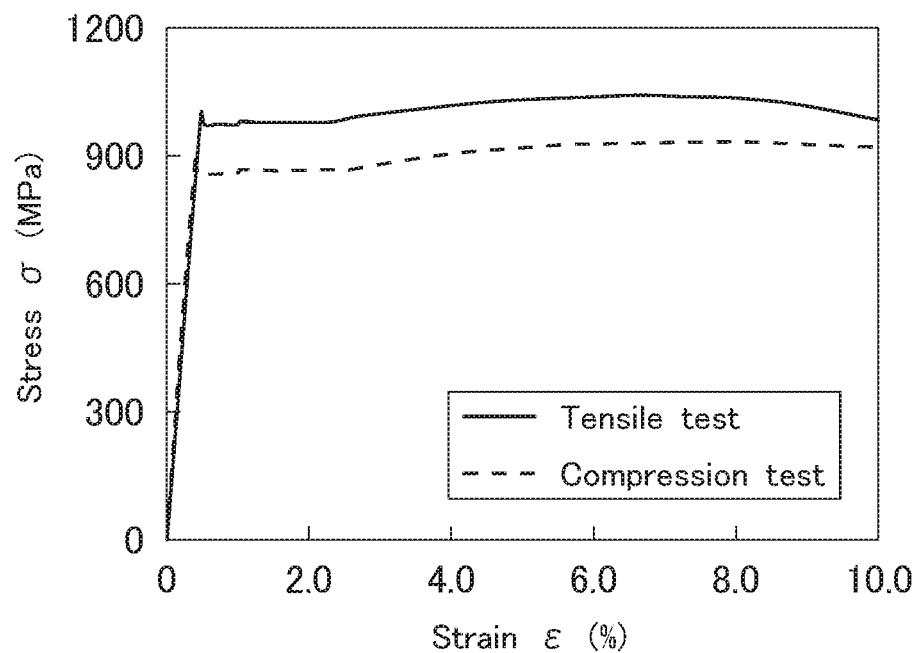
FIG. 2B shows a tensile stress-strain curve and a compressive stress-strain curve in a circumferential direction of steel pipe in a case in which hot straightening is performed after quenching and tempering.
Figure 2C:
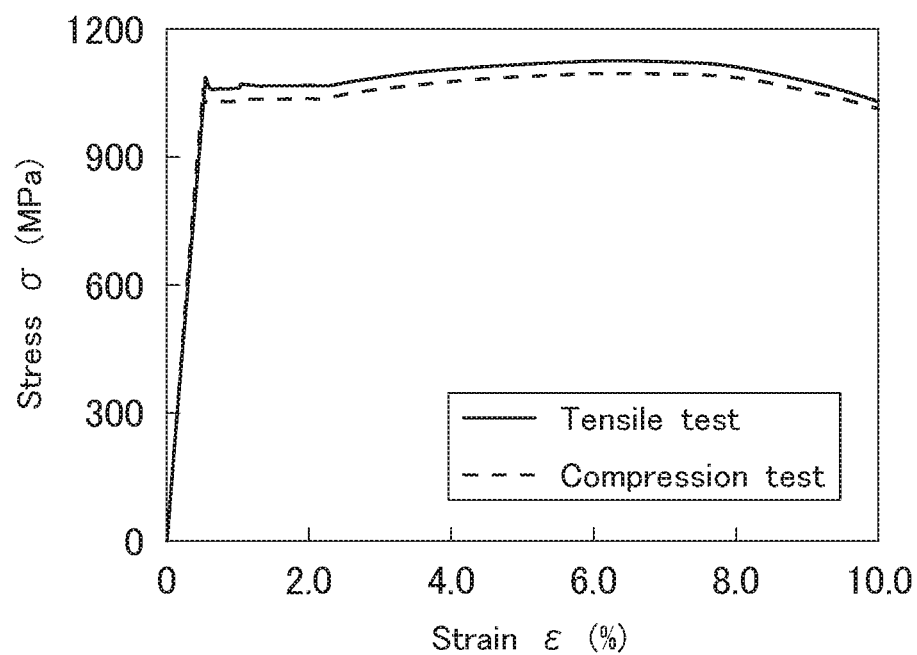
FIG. 2C shows a tensile stress-strain curve and a compressive stress-strain curve in a circumferential direction of steel pipe in a case in which hot straightening is performed after quenching and tempering, and thereafter difference between the tensile yield strength in the circumferential direction of steel pipe and the compressive yield strength in the circumferential direction of steel pipe is reduced.

Here, a tensile stress-strain curve and a compressive stress-strain curve in the circumferential direction of the steel pipe of Test Number 1 are shown in FIG. 2A. Similarly, a tensile stress-strain curve and a compressive stress-strain curve in the circumferential direction of the steel pipe of Test Number 2 are shown in FIG. 2B. Similarly, a tensile stress-strain curve and a compressive stress-strain curve in the circumferential direction of the steel pipe of Test Number 3 are shown in FIG. 2C.

Further, the amount of dissolved C (mass %) was calculated based on a test method and a calculation method to be described later. Note that the amount of dissolved C was calculated from the difference between the C content of a steel pipe and the amount of C which precipitated as carbides (hereinafter, also referred to as a precipitated C amount). The precipitated C amount was calculated from the residual amounts of Fe, Cr, Mn, Mo, V, and Nb and the concentration in cementite of Fe, Cr, Mn, and Mo. The calculated amounts of dissolved C (mass %) are shown in Table 3.

Further, for a steel pipe of each test number, an evaluation result of the constant load tensile test to be described later and a fracture toughness value $K_{ISSC}$ (MPa√m) obtained by the DCB test to be described later are shown in Table 3.

Referring to FIG. 2A, in the steel pipe of Test Number 1, the tensile stress-strain curve and the compressive stress-strain curve in the circumferential direction of steel pipe were mostly superposed on each other. That is, in the steel pipe of Test Number 1, anisotropy of the yield strength in the circumferential direction of steel pipe was hardly recognized. Referring to Table 3, further in the steel pipe of Test Number 1, the difference between the tensile yield strength in the circumferential direction and the compressive yield strength in the circumferential direction of steel pipe was 5 MPa. As a result, referring to Table 3, the steel pipe of Test Number 1 exhibited excellent SSC resistance in both the constant load tensile test and the DCB test.

On the other hand, referring to FIG. 2B, in the steel pipe of Test Number 2, the difference between the tensile stress-strain curve and the compressive stress-strain curve in the circumferential direction of steel pipe increased. That is, in the steel pipe of Test Number 2, anisotropy of the yield strength in the circumferential direction of steel pipe was recognized. Referring to Table 3, further in the steel pipe of Test Number 2, the difference between the tensile yield strength in the circumferential direction and the compressive yield strength in the circumferential direction of steel pipe was more than 80 MPa. As a result of that, referring to Table 3, the steel pipe of Test Number 2 exhibited excellent SSC resistance in the DCB test, but on the other hand, did not exhibit excellent SSC resistance in the constant load tensile test.

Further, referring to FIG. 2C, in the steel pipe of Test Number 3, the difference between the tensile stress-strain curve and the compressive stress-strain curve in the circumferential direction of steel pipe decreased. That is, in the steel pipe of Test Number 3, anisotropy of the yield strength in the circumferential direction of steel pipe was reduced compared with in the steel pipe of Test Number 2. Referring to Table 3, further in the steel pipe of Test Number 3, the difference between the tensile yield strength in the circumferential direction and the compressive yield strength in the circumferential direction of steel pipe was 80 MPa or less. As a result of that, referring to Table 3, the steel pipe of Test Number 3 exhibited excellent SSC resistance both in the constant load tensile test and the DCB test.

That is, to improve the result of the constant load tensile test of a steel pipe which has been subjected to hot straightening after quenching and tempering, it is only necessary to reduce anisotropy of the yield strength in the circumferential direction of steel pipe. Specifically, if the difference between the tensile yield strength in the circumferential direction and the compressive yield strength in the circumferential direction of a steel pipe according to the present embodiment is 80 MPa or less, it is possible to achieve excellent SSC resistance not only in the DCB test, but also in the constant load tensile test even in a case in which hot straightening is performed after quenching and tempering. Therefore, the difference between the tensile yield strength in the circumferential direction and the compressive yield strength in the circumferential direction of the steel pipe according to the present embodiment is set to 80 MPa or less.

Note that the microstructure of the steel pipe according to the present embodiment is a structure mainly composed of tempered martensite and tempered bainite. The term "mainly composed of tempered martensite and tempered bainite" means that the total volume ratio of tempered martensite and tempered bainite is 90% or more. If the microstructure of a steel pipe is mainly composed of tempered martensite and tempered bainite, in the steel pipe according to the present embodiment, the yield strength (meaning the tensile yield strength in the axial direction as described above) will be in a range of 862 to 1069 MPa (125 to 155 ksi, that is, 125 ksi grade or 140 ksi grade), and the yield ratio (a ratio of the yield strength to the tensile strength, that is, a yield ratio (YR)=yield strength (YS)/tensile strength (TS)) will be 90% or more.

The steel pipe according to the present embodiment, which has been completed based on the above described findings, contains a chemical composition consisting of, in mass %, C: more than 0.50 to 0.65%, Si: 0.05 to 0.50%, Mn: 0.05 to 1.00%. P: 0.025% or less, S: 0.0050% or less, Al: 0.005 to 0.100%, Cr: 0.30 to 1.50%, Mo: 0.25 to 3.00%, Ti: 0.002 to 0.050%, N: 0.0010 to 0.0100%, O: 0.0030% or less, V: 0 to 0.300%, Nb: 0 to 0.100%, B: 0 to 0.0030%, Ca 0 to 0.0100%, Mg: 0 to 0.0100%. Zr: 0 to 0.0100%. Co: 0 to 1.00%, W: 0 to 1.00%, Ni: 0 to 0.50%, and Cu: 0 to 0.50%, with the balance being Fe and impurities. The steel pipe according to the present embodiment contains 0.010 to 0.060 mass % of dissolved C. The steel pipe according to the present embodiment has a tensile yield strength in the axial direction of steel pipe in a range of 862 to 1069 MPa, and a yield ratio in the axial direction of steel pipe of 90% or more. The steel pipe according to the present embodiment has a tensile yield strength in the circumferential direction of steel pipe in a range of 862 to 1069 MPa. and the tensile yield strength in the circumferential direction of steel pipe is 30 to 80 MPa higher than the compressive yield strength in the circumferential direction of steel pipe.

The above described chemical composition may contain one or more types of element selected from the group consisting of V: 0.010 to 0.300% and Nb: 0.002 to 0.100%.

The above described chemical composition may contain B: 0.0001 to 0.0030%.

The aforementioned chemical composition may contain one or more types of element selected from the group consisting of Ca: 0.0001 to 0.0100%, Mg: 0.0001 to 0.0100% and Zr: 0.0001 to 0.0100%.

The aforementioned chemical composition may contain one or more types of element selected from the group consisting of Co: 0.02 to 1.00% and W: 0.02 to 1.00%.

The aforementioned chemical composition may contain one or more types of element selected from the group consisting of Ni: 0.02 to 0.50% and Cu: 0.01 to 0.50%.

The aforementioned steel pipe may be an oil-well steel pipe.

In the present description, the oil-well steel pipe may be a steel pipe that is used for a line pipe or may be a steel pipe used for oil country tubular goods (OCTG). The shape of the oil-well steel pipe is not particularly limited and may be, for example, a seamless steel pipe or a welded steel pipe. The oil country tubular goods are, for example, steel pipes that are used as casing pipes or tubing pipes.

The aforementioned steel pipe may be a seamless steel pipe.

If the steel pipe according to the present embodiment is a seamless steel pipe, even if the wall thickness is 15 mm or more, the oil-well steel pipe will have a yield strength within a range of 862 to 1069 MPa (125 to 155 ksi, that is, 125 ksi grade or 140 ksi grade) and excellent SSC resistance.

The term "excellent SSC resistance" mentioned above can be, specifically, evaluated by the DCB test in accordance with NACE TM0177-2005 Method D and the constant load tensile test in accordance with NACE TM177-2005 Method A.

In the DCB test, a mixed aqueous solution containing 5.0 mass % of sodium chloride and 0.4 mass % of sodium acetate that is adjusted to pH 3.5 using acetic acid (NACE solution B) is employed as the test solution. A wedge that is taken from a steel pipe is driven in a test specimen that is taken from the steel pipe, the test specimen into which the wedge was driven is then enclosed inside a test vessel.

The test solution is poured into the test vessel so as to leave a vapor phase portion, and is adopted as the test bath. After the test bath is degassed, a gaseous mixture consisting of 0.1 atm $H_2S$ and 0.9 atm $CO_2$ is blown into the test vessel to make the test bath a corrosive environment. After the test bath that is immersing the test specimen being held at a temperature of 24° C. for 17 days (408 hours) while stirring the test bath, the fracture toughness value $K_{ISSC}$ is obtained from the test specimen being taken out from the test vessel.

In a steel pipe according to the present embodiment, the fracture toughness value $K_{ISSC}$ of determined under the foregoing DCB test is 30.0 MPa m or more. Further in the steel pipe according to the present embodiment, if the tensile yield strength in the axial direction is in a range of 862 to less than 965 MPa (125 ksi grade), the fracture toughness value $K_{ISSC}$ of determined under the foregoing DCB test is 35.0 MPa√m or more.

In the constant load tensile test, a mixed aqueous solution containing 5.0 mass % of sodium chloride and 0.4 mass % of sodium acetate that is adjusted to pH 3.5 using acetic acid (NACE solution B) is employed as the test solution. A stress is applied to a test specimen that is taken from a steel pipe. In a case where the tensile yield strength in the axial direction is in a range of 862 to less than 965 MPa (125 ksi grade), stress (776 MPa) corresponding to 90% of 125 ksi (862 MPa) is applied. In a case where the tensile yield strength in the axial direction is in a range of 965 to 1069 MPa (140 ksi grade), stress (869 MPa) corresponding to 90% of 140 ksi (965 MPa) is applied.

The test solution is poured into a test vessel so that the test specimen to which the stress has been applied is immersed therein, and this is adopted as a test bath. After degassing the test bath, a mixed gas of 0.1 atm of $H_2S$ and 0.9 atm of $CO_2$ is blown into the test bath and is caused to saturate in the test bath. The test bath in which the test specimen is immersed is held for 720 hours at 24° C. In the steel pipe according to the present embodiment, cracking is not confirmed after elapse of 720 hours at a condition of the aforementioned constant load tensile test.

Further, the term "amount of dissolved C" mentioned above means the difference between the amount of C (mass %) in carbides in the steel pipe and the C content of the chemical composition of the steel pipe. The amount of C in carbides in the steel pipe is determined by Formula (1) to Formula (5) using an Fe concentration <Fe>a, a Cr concentration <Cr>a, an Mn concentration <Mn>a, an Mo concentration <Mo>a, a V concentration <V>a and an Nb concentration <Nb>a in carbides (cementite and MC-type carbides) obtained as residue when extraction residue analysis is performed on the steel pipe, and an Fe concentration <Fe>b, a Cr concentration <Cr>b, an Mn concentration <Mn>b and an Mo concentration <Mo>b in cementite obtained by performing point analysis by energy dispersive X-ray spectrometry (hereunder, also referred to as "EDS") with respect to cementite identified by performing transmission electron microscope (hereunder, also referred to as "TEM") observation of a replica film obtained by an extraction replica method.

$$<Mo>c=(<Fe>a+<Cr>a+<Mn>a)\times<Mo>b/(<Fe>b+<Cr>b+<Mn>b) \quad (1)$$

$$<Mo>d=<Mo>a-<Mo>c \quad (2)$$

$$<C>a=(<Fe>a/55.85+<Cr>a/52+<Mn>a/53.94+<Mo>c/95.9)/3\times12 \quad (3)$$

$$<C>b=(<V>a/50.94+<Mo>d/95.9+<Nb>a/92.9)\times12 \quad (4)$$

$$(\text{amount of dissolved C})=<C>-(<C>a+<C>b) \quad (5)$$

Note that, in the present description, the term "cementite" means carbides containing an Fe content of 50 mass % or more.

A method for producing a steel pipe according to the present embodiment includes a preparation process, a quenching process, a tempering process, a hot straightening process, a hollow shell temperature adjustment process, and a rapid cooling process. In the preparation process, a hollow shell containing the aforementioned chemical composition is prepared. In the quenching process, after the preparation process, the hollow shell that is at a temperature in a range of 800 to 1000° C. is cooled at a cooling rate of 120° C./min or more. In the tempering process, the hollow shell after the quenching process is held at a tempering temperature of 670° C. to an $A_{c1}$ point for 10 to 180 minutes. In the hot straightening process, the hollow shell after the tempering process is subjected to hot straightening at a temperature of 600° C. to the tempering temperature. In the hollow shell temperature adjustment process, the temperature of the hollow shell is maintained in a range from the temperature of the hollow shell at the time of completion of the hot straightening to 500° C. for 10 to 120 seconds after the completion of the hot straightening. In the rapid cooling process, the hollow shell after the hollow shell temperature adjustment process is cooled at a cooling rate of 5 to 100° C./sec in a temperature range of the hollow shell of 500 to 200° C.

The preparation process of the aforementioned production method may include a starting material preparation process of preparing a starting material containing the aforementioned chemical composition, and a hot working process of subjecting the starting material to hot working to produce a hollow shell.

Hereunder, the steel pipe according to the present embodiment is described in detail. The symbol "%" in relation to an element means "mass percent" unless specifically stated otherwise.

[Chemical Composition]

The chemical composition of the steel pipe according to the present embodiment contains the following elements.

C: more than 0.50 to 0.65%

Carbon (C) enhances the hardenability of the steel pipe and increases the strength of the steel pipe. Consequently, if the C content is too low, a yield strength not less than 826 MPa cannot not be obtained in some cases. C also promotes spheroidization of carbides during tempering in the production process, and increases the SSC resistance of the steel pipe. If the carbides are dispersed, the strength of the steel pipe increases further. These effects will not be obtained if the C content is too low. On the other hand, if the C content is too high, the toughness of the steel pipe will decrease and quench cracking is liable to occur. Therefore, the C content is within the range of more than 0.50 to 0.65%. A preferable lower limit of the C content is 0.51%, and more preferably is 0.52%. A preferable upper limit of the C content is 0.63%, and more preferably is 0.61%.

Si: 0.05 to 0.50%

Silicon (Si) deoxidizes the steel. If the Si content is too low, this effect is not obtained. On the other hand, if the Si content is too high, the SSC resistance of the steel pipe decreases. Therefore, the Si content is within the range of 0.05 to 0.50%. A preferable lower limit of the Si content is 0.15%, and more preferably is 0.20%. A preferable upper limit of the Si content is 0.45%, and more preferably is 0.40%.

Mn: 0.05 to 1.00%

Manganese (Mn) deoxidizes the steel. Mn also enhances the hardenability of the steel pipe. If the Mn content is too low, these effects are not obtained. On the other hand, if the Mn content is too high, Mn segregates at grain boundaries together with impurities such as P and S. In such a case, the SSC resistance of the steel pipe will decrease. Therefore, the Mn content is within a range of 0.05 to 1.00%. A preferable lower limit of the Mn content is 0.25%, and more preferably is 0.30%. A preferable upper limit of the Mn content is 0.90%, and more preferably is 0.80%.

P: 0.025% or Less

Phosphorous (P) is an impurity. In other words, the P content is more than 0%. P segregates at the grain boundaries and decreases the SSC resistance of the steel pipe. Therefore, the P content is 0.025% or less. A preferable upper limit of the P content is 0.020%, and more preferably is 0.015%. Preferably, the P content is as low as possible. However, if the P content is excessively reduced, the production cost increases significantly. Therefore, when taking industrial production into consideration, a preferable lower limit of the P content is 0.0001%, more preferably is 0.0003%, and further preferably is 0.001%.

S: 0.0050% or Less

Sulfur (S) is an impurity. In other words, the S content is more than 0%. S segregates at the grain boundaries and decreases the SSC resistance of the steel pipe. Therefore, the S content is 0.0050% or less. A preferable upper limit of the S content is 0.0040%, and more preferably is 0.0030%. Preferably, the S content is as low as possible. However, if the S content is excessively reduced, the production cost increases significantly. Therefore, when taking industrial production into consideration, a preferable lower limit of the S content is 0.0001%, more preferably is 0.0002%, and further preferably is 0.0003%.

Al: 0.005 to 0.100%

Aluminum (Al) deoxidizes the steel. If the Al content is too low, this effect is not obtained and the SSC resistance of the steel pipe decreases. On the other hand, if the Al content is too high, coarse oxide-based inclusions are formed and the SSC resistance of the steel pipe decreases. Therefore, the Al content is within a range of 0.005 to 0.100%. A preferable lower limit of the Al content is 0.015%, and more preferably is 0.020%. A preferable upper limit of the Al content is 0.080%, and more preferably is 0.060%. In the present description, the "Al" content means "acid-soluble Al", that is, the content of "sol. Al".

Cr: 0.30 to 1.50%

Chromium (Cr) enhances the hardenability of the steel pipe. Cr also increases temper softening resistance and enables high-temperature tempering. As a result, the SSC resistance of the steel pipe increases. If the Cr content is too low, these effects are not obtained. On the other hand, if the Cr content is too high, the toughness and SSC resistance of the steel pipe decreases. Therefore, the Cr content is within a range of 0.30 to 1.50%. A preferable lower limit of the Cr content is 0.35%, and more preferably is 0.40%. A preferable upper limit of the Cr content is 1.30%.

Mo: 0.25 to 3.00%

Molybdenum (Mo) enhances the hardenability of the steel pipe. Mo also forms fine carbides and increases the temper softening resistance of the steel pipe. As a result, Mo increases the SSC resistance of the steel pipe by high temperature tempering. If the Mo content is too low, these effects are not obtained. On the other hand, if the Mo content is too high, the aforementioned effects are saturated. Therefore, the Mo content is within a range of 0.25 to 3.00%. A preferable lower limit of the Mo content is 0.50%, more preferably is 0.55%, and further preferably is 0.65%. A preferable upper limit of the Mo content is 2.50%, and more preferably is 2.00%.

Ti: 0.002 to 0.050%

Titanium (Ti) forms nitrides, and refines crystal grains by the pinning effect. As a result, the strength of the steel pipe increases. If the Ti content is too low, this effect is not obtained. On the other hand, if the Ti content is too high, Ti nitrides coarsen and the SSC resistance of the steel pipe decreases. Therefore, the Ti content is within a range of 0.002 to 0.050%. A preferable lower limit of the Ti content is 0.003%, and more preferably is 0.005%. A preferable upper limit of the Ti content is 0.030%, and more preferably is 0.020%.

N: 0.0010 to 0.0100%

Nitrogen (N) combines with Ti to form fine nitrides and thereby refines crystal grains. If the N content is too low, this effect cannot be obtained. On the other hand, if the N content is too high, N will form coarse nitrides and the SSC resistance of the steel pipe will decrease. Therefore, the N content is within the range of 0.0010 to 0.0100%. A preferable upper limit of the N content is 0.0050%, and more preferably is 0.0040%. A preferable lower limit of the N content is 0.0015%.

O: 0.0030% or Less

Oxygen (O) is an impurity. In other words, the O content is more than 0%. O forms coarse oxides and reduces the corrosion resistance of the steel pipe. Therefore, the O content is 0.0030% or less. A preferable upper limit of the O content is 0.0020%. Preferably, the O content is as low as possible. However, if the O content is excessively reduced, the production cost increases significantly. Therefore, when taking industrial production into consideration, a preferable lower limit of the O content is 0.0001%, more preferably is 0.0002%, and further preferably is 0.0003%.

The balance of the chemical composition of the steel pipe according to the present embodiment is Fe and impurities. Here, the term "impurities" refers to elements which, during industrial production of the steel pipe, are mixed in from ore or scrap that is used as a raw material of the steel pipe, or from the production environment or the like, and which are allowed within a range that does not adversely affect the steel pipe according to the present embodiment.

[Regarding Optional Elements]

The chemical composition of the steel pipe described above may further contain one or more types of element selected from the group consisting of V and Nb in lieu of a part of Fe. Each of these elements is an optional element, and increases the SSC resistance of the steel pipe.

V: 0 to 0.300%

Vanadium (V) is an optional element, and need not be contained. In other words, the V content may be 00%. If contained, V combines with C or N to form carbides, nitrides or carbo-nitrides (hereinafter, referred to as "carbo-nitrides and the like"). The carbo-nitrides and the like refine the substructure of the steel pipe by the pinning effect, and improve the SSC resistance of the steel pipe. V also forms fine carbides during tempering. The fine carbides increase the temper softening resistance of the steel pipe, and increase the strength of the steel pipe. In addition, because V also forms spherical MC-type carbides, V suppresses the formation of acicular $M_2C$-type carbides and thereby increases the SSC resistance of the steel pipe. If even a small amount of V is contained, aforementioned effects are obtained to a certain extent. However, if the V content is too high, the toughness of the steel pipe decreases. Therefore, the V content is within the range of 0 to 0.300%. A preferable lower limit of the V content is more than 0%, more preferably is 0.010%, and further preferably is 0.020%. A preferable upper limit of the V content is 0.200%, more preferably is 0.150%, and further preferably is 0.120%.

Nb: 0 to 0.100%

Niobium (Nb) is an optional element, and need not be contained. In other words, the Nb content may be 0%. If contained, Nb forms carbo-nitrides and the like. The carbo-nitrides and the like refine the substructure of the steel pipe by the pinning effect, and increase the SSC resistance of the steel pipe. In addition, because Nb also forms spherical MC-type carbides, Nb suppresses the formation of acicular $M_2C$-type carbides and thereby increases the SSC resistance of the steel pipe. If even a small amount of Nb is contained, aforementioned effects are obtained to a certain extent. However, if the Nb content is too high, carbo-nitrides and the like are excessively formed and the SSC resistance of the steel pipe decreases. Therefore, the Nb content is within the range of 0 to 0.100%. A preferable lower limit of the Nb content is more than 0%, more preferably is 0.002%, further preferably is 0.003%, and further preferably is 0.007%. A preferable upper limit of the Nb content is 0.075%, and more preferably is 0.050%.

A total of the contents of the aforementioned V and Nb is preferably 0.300% or less, and further preferably is 0.200% or less.

The chemical composition of the steel pipe described above may further contain B in lieu of a part of Fe.

B: 0 to 0.0030%

Boron (B) is an optional element, and need not be contained. In other words, the B content may be 0%. If contained, B is dissolved into steel and improves the hardenability of a steel pipe, thereby increasing the strength of the steel pipe. If even a small amount of B is contained, the aforementioned effect is obtained to a certain extent. However, if the B content is too high, a coarse nitride is formed and the SSC resistance of the steel pipe decreases. Therefore, the B content is 0 to 0.0030%. The preferable lower limit of the B content is more than 0%, more preferably is 0.0001%, further preferably is 0.0003%, and further preferably is 0.0007%. The preferable upper limit of the B content is 0.0025%.

The chemical composition of the steel pipe described above may further contain one or more types of element selected from the group consisting of Ca, Mg and Zr in lieu of a part of Fe. Each of these elements is an optional element, and increases the SSC resistance of the steel pipe.

Ca 0 to 0.0100%

Calcium (Ca) is an optional element, and need not be contained. In other words, the Ca content may be 0%. If contained, Ca renders S in the steel pipe harmless by forming sulfides, and increases the SSC resistance of the steel pipe. If even a small amount of Ca is contained, aforementioned effect is obtained to a certain extent. However, if the Ca content is too high, oxides in the steel pipe coarsen and the SSC resistance of the steel pipe decreases. Therefore, the Ca content is within the range of 0 to 0.0100%. A preferable lower limit of the Ca content is more than 0%, more preferably is 0.0001%, further preferably is 0.0003%, further preferably is 0.0006%, and further preferably is 0.0010%. A preferable upper limit of the Ca content is 0.0025%, and more preferably is 0.0020%.

Mg: 0 to 0.0100%

Magnesium (Mg) is an optional element, and need not be contained. In other words, the Mg content may be 0%. If contained, Mg renders S in the steel pipe harmless by forming sulfides, and increases the SSC resistance of the steel pipe. If even a small amount of Mg is contained, aforementioned effect is obtained to a certain extent. However, if the Mg content is too high, oxides in the steel pipe coarsen and decrease the SSC resistance of the steel pipe. Therefore, the Mg content is within the range of 0 to 0.0100%. A preferable lower limit of the Mg content is more than 0%, more preferably is 0.0001%, further preferably is 0.0003%, and further preferably is 0.0006%, and even further preferably is 0.0010%. A preferable upper limit of the Mg content is 0.0025%, and more preferably is 0.0020%.

Zr: 0 to 0.0100%

Zirconium (Zr) is an optional element, and need not be contained. In other words, the Zr content may be 0%. If contained, Zr renders S in the steel pipe harmless by forming sulfides, and increases the SSC resistance of the steel pipe. If even a small amount of Zr is contained, aforementioned effect is obtained to a certain extent. However, if the Zr content is too high, oxides in the steel pipe coarsen and the SSC resistance of the steel pipe decreases. Therefore, the Zr content is within the range of 0 to 0.0100%. A preferable lower limit of the Zr content is more than 0%, more preferably is 0.0001%, further preferably is 0.0003%, further preferably is 0.0006%, and further preferably is 0.0010%. A preferable upper limit of the Zr content is 0.0025%, and more preferably is 0.0020%.

In a case where two or more types of element selected from the aforementioned group containing Ca, Mg and Zr are contained in combination, the total of the contents of these elements is preferably 0.0100% or less, and more preferably is 0.0050% or less.

The chemical composition of the steel pipe described above may further contain one or more types of element selected from the group consisting of Co and W in lieu of a part of Fe. Each of these elements is an optional element that forms a protective corrosion coating in the sour environment and suppresses hydrogen penetration. By this means, each of these elements increases the SSC resistance of the steel pipe.

Co: 0 to 1.00%

Cobalt (Co) is an optional element, and need not be contained. In other words, the Co content may be 0%. If contained, Co forms a protective corrosion coating in the sour environment and suppresses hydrogen penetration. By this means, Co increases the SSC resistance of the steel pipe. If even a small amount of Co is contained, aforementioned effect is obtained to a certain extent. However, if the Co content is too high, the hardenability of the steel pipe will decrease, and the strength of the steel pipe will decrease. Therefore, the Co content is within the range of 0 to 1.00%. A preferable lower limit of the Co content is more than 0%, more preferably is 0.02%, and further preferably is 0.05%. A preferable upper limit of the Co content is 0.80%, and more preferably is 0.70%.

W: 0 to 1.00%

Tungsten (W) is an optional element, and need not be contained. In other words, the W content may be 0%. If contained, W forms a protective corrosion coating in the sour environment and suppresses hydrogen penetration. By this means, W increases the SSC resistance of the steel pipe. If even a small amount of W is contained, aforementioned effect is obtained to a certain extent. However, if the W content is too high, coarse carbides form in the steel pipe and the SSC resistance of the steel pipe decreases. Therefore, the W content is within the range of 0 to 1.00%. A preferable lower limit of the W content is more than 0%, more preferably is 0.02%, and further preferably is 0.05%. A preferable upper limit of the W content is 0.80%, and more preferably is 0.70%.

The chemical composition of the steel pipe described above may further contain one or more types of element selected from the group consisting of Ni and Cu in lieu of a part of Fe. Each of these elements is an optional element, and increases the hardenability of the steel pipe.

Ni: 0 to 0.50%

Nickel (Ni) is an optional element, and need not be contained. In other words, the Ni content may be 0%. If contained, Ni enhances the hardenability of the steel pipe and increases the strength of the steel pipe. If even a small amount of Ni is contained, aforementioned effect is obtained to a certain extent. However, if the Ni content is too high, the Ni will promote local corrosion, and the SSC resistance of the steel pipe will decrease. Therefore, the Ni content is within the range of 0 to 0.50%. A preferable lower limit of the Ni content is more than 0%, more preferably is 0.01%, further preferably is 0.02%, and further preferably is 0.05%. A preferable upper limit of the Ni content is 0.35%, and more preferably is 0.25%.

Cu: 0 to 0.50%

Copper (Cu) is an optional element, and need not be contained. In other words, the Cu content may be 0%. If contained, Cu enhances the hardenability of the steel pipe and increases the strength of the steel pipe. If even a small amount of Cu is contained, aforementioned effect is obtained to a certain extent. However, if the Cu content is too high, the hardenability of the steel pipe will be too high, and the SSC resistance of the steel pipe will decrease. Therefore, the Cu content is within the range of 0 to 0.50%. A preferable lower limit of the Cu content is more than 0%, more preferably is 0.01%, further preferably is 0.02%, and further preferably is 0.05%. A preferable upper limit of the Cu content is 0.35%, and more preferably is 0.25%.

[Amount of Dissolved C]

The steel pipe according to the present embodiment contains an amount of dissolved C which is within the range of 0.010 to 0.060 mass %. If the amount of dissolved C is less than 0.010 mass %, the immobilization of dislocations in the steel pipe will be insufficient and the steel pipe having excellent SSC resistance will not be obtained. Note that in the ranges of the chemical composition and the mechanical properties (yield strength (125 ksi grade or 140 ksi grade) and yield strength in circumferential direction to be described later) of the present embodiment, if the amount of dissolved C is 0.060 mass % or less, a steel pipe having excellent SSC resistance can be obtained. Therefore, the amount of dissolved C is within the range of 0.010 to 0.060 mass %. A preferable lower limit of the amount of dissolved C is 0.015 mass % and more preferably is 0.020 mass %.

[Method for Calculating Amount of Dissolved C]

The term "amount of dissolved C" means the difference between the amount of C (mass %) in carbides in the steel pipe and the C content of the chemical composition of the steel pipe. The amount of C in carbides in the steel pipe is determined by Formula (1) to Formula (5) using an Fe concentration $<Fe>a$, a Cr concentration $<Cr>a$, an Mn concentration $<Mn>a$, an Mo concentration $<Mo>a$, a V concentration $<V>a$ and an Nb concentration $<Nb>a$ in carbides (cementite and MC-type carbides) obtained as residue when extraction residue analysis is performed on the steel pipe, and an Fe concentration $<Fe>b$, a Cr concentration $<Cr>b$, an Mn concentration $<Mn>b$ and an Mo concentration $<Mo>b$ in cementite obtained by performing point analysis by EDS with respect to cementite identified by performing TEM observation of a replica film obtained by an extraction replica method.

$$<Mo>c=(<Fe>a+<Cr>a+<Mn>a)\times<Mo>b(<Fe>b+<Cr>b+<Mn>b) \qquad (1)$$

$$<Mo>d=<Mo>a-<Mo>c \qquad (2)$$

$$<C>a=(<Fe>a/55.85+<Cr>a/52+<Mn>a/53.94+<Mo>c/95.9)/3\times12 \qquad (3)$$

$$<C>b=(<V>a/50.94+<Mo>d/95.9+<Nb>a/92.9)\times12 \qquad (4)$$

$$(\text{amount of dissolved C})=<C>-(<C>a+<C>b) \qquad (5)$$

Note that, in the present description, the term "cementite" means carbides containing an Fe content of 50 mass % or more. Hereunder, the method for calculating the amount of dissolved C is described in detail.

[Determination of C Content of Steel Pipe]

An analysis sample having the shape of a machined chip is taken from a center portion of the wall thickness of the steel pipe. The C content (mass %) is analyzed by an oxygen-stream combustion-infrared absorption method. The resulting value was taken to be the C content ($<C>$) of the steel pipe.

[Calculation of C Amount that Precipitates as Carbides (Precipitated C Amount)]

The precipitated C amount is calculated by the following procedures 1 to 4. Specifically, in procedure 1 an extraction residue analysis is performed. In procedure 2, an extraction replica method using a TEM, and an element concentration analysis (hereunder, referred to as "EDS analysis") of elements in cementite is performed by EDS. In procedure 3, the Mo content is adjusted. In procedure 4, the precipitated C amount is calculated.

[Procedure 1. Determination of Residual Amounts of Fe, Cr, Mn, Mo, V and Nb by Extraction Residue Analysis]

In procedure 1, carbides in the steel pipe are captured as residue, and the contents of Fe, Cr, Mn, Mo, V and Nb in the residue are determined. Here, the term "carbides" is a generic term for cementite ($M_3C$-type carbides) and MC-type carbides. The specific procedure is as follows. A cylindrical test specimen having a diameter of 6 mm and a length of 50 mm is extracted from a center portion of the wall thickness of the steel pipe in a manner so that the center of the wall thickness becomes the center of the cross-section. The surface of the extracted test specimen is polished to remove about 50 μm by preliminary electropolishing to obtain a newly formed surface. The electropolished test specimen is subjected to electrolysis in an electrolyte solution of 10% acetylacetone+1% tetra-ammonium+methanol. The electrolyte solution after electrolysis is passed through a 0.2-μm filter to capture residue. The obtained residue is subjected to acid decomposition, and the concentrations of Fe, Cr, Mn, Mo, V and Nb are determined in units of mass percent by ICP (inductively coupled plasma) optical emission spectrometry. The concentrations are defined as $<Fe>a$, $<Cr>a$, $<Mn>a$, $<Mo>a$, $<V>a$ and $<Nb>a$, respectively.

[Procedure 2. Determination of Content of Fe, Cr, Mn and Mo in Cementite by Extraction Replica Method and EDS]

In procedure 2, the content of each of Fe, Cr, Mn and Mo in cementite is determined. The specific procedure is as follows. A micro test specimen is cut out from a center portion of the wall thickness of the steel pipe, and the surface of the micro test specimen is finished by mirror polishing. The test specimen is immersed for 10 minutes in a 3% nital etching reagent to etch the surface. The surface thereof is covered with a carbon deposited film. The test specimen whose surface is covered with the deposited film is immersed in a 5% nital etching reagent, and held therein for 20 minutes to cause the deposited film to peel off. The deposited film that peeled off is cleaned with ethanol, and thereafter is scooped up with a sheet mesh and dried. The deposited film (replica film) is observed using a TEM, and point analysis by EDS is performed with respect to 20 particles of cementite. The concentration of each of Fe, Cr, Mn and Mo is determined in units of mass percent when taking the total of the alloying elements excluding carbon in the cementite as 100%. The concentrations are determined for 20 particles of cementite, and the arithmetic average values for the respective elements are defined as $<Fe>b$, $<Cr>b$, $<Mn>b$ and $<Mo>b$.

[Procedure 3. Adjustment of Mo Amount]

Next, the Mo concentration in the carbides is determined. In this case, Fe, Cr, Mn and Mo concentrate in cementite. On the other hand, V, Nb and Mo concentrate in MC-type carbides. In other words, Mo is caused to concentrate in both cementite and MC-type carbides by tempering. Therefore, the Mo amount is calculated separately for cementite and for MC-type carbides. Note that, in some cases a part of V also concentrates in cementite. However, the amount of V that concentrates in cementite is negligibly small in comparison to the amount of V that concentrates in MC-type carbides. Therefore, when determining the amount of dissolved C, V is regarded as concentrating only in MC-type carbides.

Specifically, the amount of Mo precipitating as cementite ($<Mo>c$) is calculated by Formula (1).

$$<Mo>c=(<Fe>a+<Cr>a+<Mn>a)\times<Mo>b/(<Fe>b+<Cr>b+<Mn>b) \quad (1)$$

On the other hand, the amount of Mo precipitating as MC-type carbides ($<Mo>d$) is calculated in units of mass percent by Formula (2).

$$<Mo>d=<Mo>a-<Mo>c \quad (2)$$

[Procedure 4. Calculation of Precipitated C Amount]

The precipitated C amount is calculated as the total of the C amount precipitating as cementite ($<C>a$) and the C amount precipitating as MC-type carbides ($<C>b$). $<C>a$ and $<C>b$ are calculated in units of mass percent by Formula (3) and Formula (4), respectively. Note that, Formula (3) is a formula that is derived from the fact that the structure of cementite is a $M_3C$ type structure (M include Fe, Cr, Mn and Mo).

$$<C>a=(<Fe>a/55.85+<Cr>a/52+<Mn>a/53.94+<Mo>c/95.9)/3\times12 \quad (3)$$

$$<C>b=(<V>a/50.94+<Mo>d/95.9+<Nb>a/92.9)\times12 \quad (4)$$

Thus, the precipitated C amount is $<C>a+<C>b$.

[Calculation of Amount of Dissolved C]

The amount of dissolved C (hereunder, also referred to as "$<C>c$") is calculated in units of mass percent by Formula (5) as a difference between the C content ($<C>$) and the precipitated C amount of the steel pipe.

$$<C>c=<C>-(<C>a+<C>b) \quad (5)$$

[Microstructure]

The microstructure of the steel pipe according to the present embodiment is principally composed of tempered martensite and tempered bainite. More specifically, the volume ratio of tempered martensite and tempered bainite in the microstructure is 90% or more. In other words, the volume ratios of tempered martensite and tempered bainite in the microstructure is 90% or more. The balance of the microstructure is, for example, ferrite or pearlite. If tempered martensite and tempered bainite are contained in an amount of 90% or more in volume ratio in the microstructure of a steel pipe containing the aforementioned chemical composition, the tensile yield strength in the axial direction of steel pipe will be in a range of 862 to 1069 MPa (125 to 155 ksi, that is 125 ksi grade or 140 ksi grade) and the yield ratio will be 90% or more.

In the present embodiment, if the tensile yield strength in the axial direction is in a range of 862 to 1069 MPa (125 to 155 ksi, that is 125 ksi grade or 140 ksi grade) and the yield ratio is 90% or more, it is assumed that the volume ratio of tempered martensite and tempered bainite in the microstructure be 90% or more. Preferably, the microstructure is composed of only tempered martensite and tempered bainite. In other words, the total volume ratio of tempered martensite and tempered bainite in the microstructure may be 100%.

Note that, the following method can be adopted in the case of determining the volume ratios of tempered martensite and tempered bainite by microstructure observation. A test specimen having an observation surface with dimensions of 10 mm in the pipe axis direction and 10 mm in the pipe circumferential direction is cut out from a center portion of the wall thickness of the steel pipe. After polishing the observation surface of the test specimen to obtain a mirror surface, the test specimen is immersed for about 10 seconds in a nital etching reagent, to reveal the microstructure by etching. The etched observation surface is observed by means of a secondary electron image obtained using a scanning electron microscope (SEM), and observation is performed for 10 visual fields. The area of each visual field is 400 μm² (magnification of ×5000).

In each visual field, tempered martensite and tempered bainite can be distinguished from other phases (ferrite or pearlite) based on contrast. Thus, in each visual field, tempered martensite and tempered bainite are identified. Then a total of area fractions of the identified tempered martensite and tempered bainite is determined. In the present embodiment, an arithmetic average value of the totals of area fractions of tempered martensite and tempered bainite determined in all visual fields is defined as a total volume ratio (%) of tempered martensite and tempered bainite.

[ε carbide ($Fe_{2.4}C$)]

In a steel pipe according to the present embodiment, the number of a carbide particles contained in the microstructure is preferably 30/μm³ or less. When the number density of ε carbide particles is more than 30/μm³, the SSC resistance of the steel pipe will decrease. Preferably, the contained a carbide is as low as possible. In other words, the number density of a carbide particles may be 0/μm³. However, it is acceptable even if 30/μm³ of a carbide particles are contained in a steel pipe. Therefore, the number density of a carbide particles is preferably 30/μm³ or less.

It is considered that a carbide precipitates by being held in a warm condition of mainly around 200° C. For this reason, alloy elements are not likely to be concentrated in a carbide. Therefore, in the present embodiment, a precipitate in which 97% in mass % or more of constituent elements excepting carbon is Fe when compositional analysis is performed is defined as a carbide.

The number density of ε carbide particles in the microstructure of a steel pipe according to the present embodiment based on the aforementioned definition can be determined by the following method. A thin film sample (thickness of 100 nm to 200 nm) for structure observation is taken from any position of a section of the steel pipe. More specifically, a thin film sample for structure observation is taken from a center portion of the wall thickness of steel pipe, and arbitrary five visual fields are identified. For identified 5 visual fields, structure observation by TEM is conducted at a magnification of 10000 times. Specifically, any 5 visual fields (1 μm×1 mμ) are identified as the observation visual field. Next, precipitates are identified based on contrast from each visual field.

For the identified precipitates, a compositional analysis by EDS of TEM is conducted. As a result of compositional analysis by EDS, a precipitate in which a 97% in mass % or more of the constituent elements excepting carbon is Fe is identified as ε carbide. A total number of ε carbide particles which are identified in the 5 visual fields are determined. From thus determined total number of ε carbide particles and the volume of the thin film sample, the number density of P carbide particles (/μm³) is determined. Note that the volume of the thin film sample can be determined from the aforementioned observation visual field area of TEM and a thickness of the thin film sample determined by analysis using Electron Energy Loss Spectroscopy (hereinafter also referred to as "EELS") associated with TEM.

[Tensile Yield Strength and Yield Ratio in the Axial Direction of Steel Pipe]

The tensile yield strength in the axial direction of a steel pipe according to the present embodiment is in a range of 862 to 1069 MPa (125 to 155 ksi, that is, 125 ksi grade or 140 ksi grade), and the yield ratio in the axial direction of a steel pipe is 90% or more. As described above, the tensile yield strength in the axial direction as used in the present description refers to the 0.2% offset proof stress obtained by a tensile test in the axial direction of a steel pipe. In short, the yield strength of a steel pipe according to the present embodiment is of 125 ksi grade or 140 ksi grade.

The tensile yield strength in the axial direction of the steel pipe according to the present embodiment can be determined by the following method. Specifically, a tensile test is conducted in a method in accordance with ASTM E8 (2013). A round bar test specimen is taken from a center portion of the wall thickness of a steel pipe according to the present embodiment. The size of the round bar test specimen is, for example, 4 mm in the diameter of the parallel portion and 35 mm in the length of the parallel portion. The axial direction of the round bar test specimen is parallel to the axial direction of the steel pipe.

The 0.2% offset proof stress obtained by conducting a tensile test using the round bar test specimen at normal temperature (25° C.) in the atmosphere is defined as tensile yield strength in the axial direction (MPa). Also, maximum stress during uniform elongation is defined as a tensile strength (MPa). A yield ratio YR (%) can be determined as a ratio of a yield strength YS to a tensile strength TS (YR=YS/TS).

[Tensile Yield Strength and Compressive Yield Strength in the Circumferential Direction of Steel Pipe]

The tensile yield strength in the circumferential direction of a steel pipe according to the present embodiment is in a range of 862 to 1069 MPa. and the tensile yield strength in the circumferential direction of a steel pipe is 30 to 80 MPa higher than the compressive yield strength in the circumferential direction of the steel pipe. As described so far, the circumferential direction of a steel pipe, as used in the present description, means a direction perpendicular to the axial direction of the steel pipe, and also perpendicular to the radial direction of the steel pipe, at any point in the steel pipe.

Therefore, the tensile yield strength in the circumferential direction of a steel pipe means the 0.2% offset proof stress obtained by a tensile test in a direction perpendicular to the axial direction of the steel pipe and also perpendicular to the radial direction of the steel pipe, at any point in the steel pipe. The compressive yield strength in the circumferential direction of a steel pipe means the 0.2% offset proof stress obtained by a compression test in a direction perpendicular to the axial direction of the steel pipe and also perpendicular to the radial direction of the steel pipe, at any point in the steel pipe.

When the tensile yield strength in the circumferential direction of a steel pipe is more than 80 MPa higher than the compressive yield strength in the circumferential direction of the steel pipe, excellent SSC resistance will not be obtained in the constant load tensile test even if excellent SSC resistance is obtained in the DCB test. On the other hand, if the straightness and/or roundness of a steel pipe after tempering is improved by hot straightening, the tensile yield strength in the circumferential direction of a steel pipe is, in some cases, 30 MPa or more higher than the compressive yield strength in the circumferential direction of the steel pipe. Therefore, in a steel pipe according to the present embodiment, the tensile yield strength in the circumferential direction of steel pipe is 30 to 80 MPa higher than the compressive yield strength in the circumferential direction of steel pipe.

The preferable lower limit of the difference between the tensile yield strength and the compressive yield strength in the circumferential direction of a steel pipe is 31 MPa, more preferably is 33 MPa, further preferably is 40 MPa, and even further preferably is 50 MPa. A steel pipe according to the present embodiment has excellent SSC resistance as a result of satisfying the aforementioned chemical composition, amount of dissolved C, microstructure, and mechanical properties even if it is subjected to hot straightening after tempering.

The tensile yield strength in the circumferential direction of a steel pipe according to the present embodiment can be measured by the following method. Specifically, a tensile test is performed in a method in accordance with ASTM E8 (2013). A round bar test specimen is taken from a center portion of the wall thickness of a steel pipe according to the present embodiment. The size of the round bar test specimen is, for example, 4 mm in the diameter of the parallel portion and 35 mm in the length of the parallel portion.

Note that the round bar test specimen is taken in such a way as that the axial direction of the round bar test specimen is perpendicular to the axial direction of the steel pipe, and also perpendicular to the radial direction of the steel pipe, in a center portion of the round bar test specimen. In other words, the axial direction of the round bar test specimen is parallel to the circumferential direction of the steel pipe in the center portion of the round bar test specimen. The 0.2% offset proof stress obtained by conducting a tensile test by using the round bar test specimen at room temperature (25° C.) in the atmosphere is defined as the tensile yield strength (MPa) in the circumferential direction.

The compressive yield strength in the circumferential direction of a steel pipe according to the present embodiment can be measured by the following method. A round bar test specimen is taken from a center portion of the wall thickness of a steel pipe according to the present embodiment as in the aforementioned measurement method of the tensile yield strength in the circumferential direction. The 0.2% offset proof stress obtained by conducting a compression test by using the round bar test specimen at room temperature (25° C.) in the atmosphere is defined as the compressive yield strength (MPa) in the circumferential direction.

A steel pipe according to the present embodiment has the aforementioned mechanical properties. Here, the aforementioned mechanical properties specifically mean that, in a steel pipe according to the present embodiment, the tensile yield strength in the axial direction is in a range of 862 to 1069 MPa (125 to 155 ksi, that is, 125 ksi grade or 140 ksi grade), the yield ratio in the axial direction is 90% or more, the tensile yield strength in the circumferential direction is in a range of 862 to 1069 MPa, and further the tensile yield strength in the circumferential direction is 30 to 80 MPa higher than the compressive yield strength in the circumferential direction.

Such mechanical properties are dependent on the microstructure (phases, precipitates and inclusions) of the steel pipe, and/or the crystal structure and/or atomic disposition of metal crystal, and further balance thereof. In recent years, measurement instruments have made remarkable progresses. However, there has not been found any measurement technique which can recognize differences in the microstructure, the crystal structure and the atomic disposition of metal crystal with a high reproducibility and a high resolution as in the mechanical properties.

In other words, the measurement technique desired in the field of alloys is a measurement technique which can recognize differences in the microstructure, the crystal structure, and the atomic disposition of metal crystal with a highest reproducibility and a high resolution. Therefore, a steel pipe that satisfies those mechanical properties and a steel pipe that does not satisfy those mechanical properties are clearly different in the microstructure, and/or the crystal structure and/or the atomic disposition of metal crystal. Therefore, a steel pipe that satisfies the aforementioned mechanical properties can effectively achieve excellent SSC resistance.

[Shape of Steel Pipe]

The shape of a steel pipe according to the present embodiment will not be particularly limited. When the steel pipe is an oil-well steel pipe, the steel pipe is preferably a seamless steel pipe. Further, in this case, a preferable wall thickness is 9 to 60 mm. The steel pipe according to the present embodiment is particularly suitable for use as a heavy-wall seamless steel pipe. More specifically, even when the steel pipe according to the present embodiment is a seamless steel pipe with a wall thickness of 15 mm or more, and further 20 mm or more, it exhibits a yield strength in a range of 862 to 1069 MPa (125 to 155 ksi, that is, 125 ksi grade or 140 ksi grade) and excellent SSC resistance.

[SSC Resistance of Steel Pipe]

The SSC resistance of a steel pipe according to the present embodiment can be evaluated by a DCB test in accordance with NACE TM0177-2005 Method D and a constant load tensile test in accordance with NACE TM0177-2005 Method A.

Figure 3A:
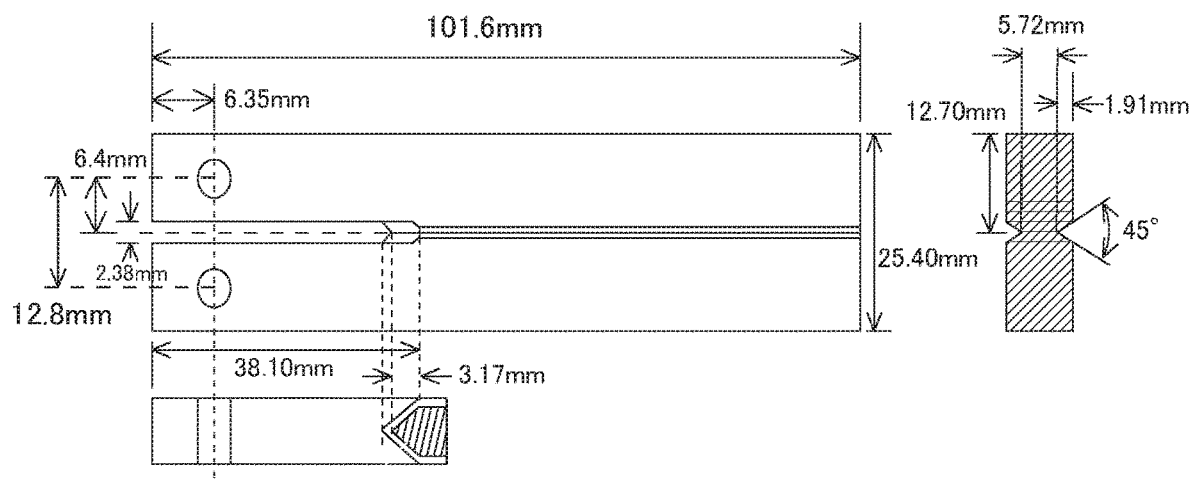
FIG. 3A shows a side view and a cross-sectional view of a DCB test specimen that is used in a DCB test in the examples.
Figure 3B:
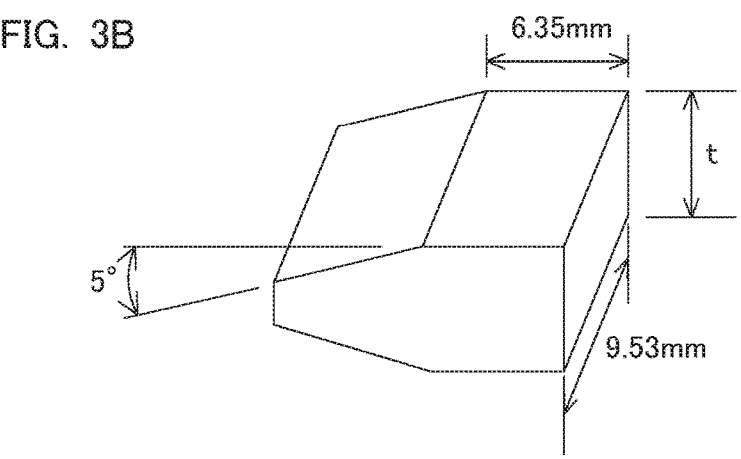
FIG. 3B is a perspective view of a wedge that is used in the DCB test in the examples.

In the DCB test, a mixed aqueous solution containing 5.0 mass % of sodium chloride and 0.4 mass % of sodium acetate that is adjusted to pH 3.5 using acetic acid (NACE solution B) is employed as the test solution. A DCB test specimen illustrated in FIG. 3A is taken from a center portion of the wall thickness of a steel pipe according to the present embodiment. The longitudinal direction of the DCB test specimen is parallel with the axial direction of the steel pipe. A wedge illustrated in FIG. 3B is also taken from the steel pipe according to the present embodiment. A thickness t of the wedge is 3.10 (mm).

Referring to FIG. 3A, the aforementioned wedge is driven in between the arms of the DCB test specimen. The DCB test specimen into which the wedge was driven is then enclosed inside a test vessel. Thereafter, the aforementioned test solution is poured into the test vessel so as to leave a vapor phase portion, and is adopted as a test bath. After the test bath is degassed, a gaseous mixture consisting of 0.1 atm $H_2S$ and 0.9 atm $CO_2$ is blown into the test vessel to make the test bath a corrosive environment. The inside of the test vessel is held at a temperature of 24° C. for 17 days (408 hours) while stirring the test bath. After being held for 408 hours, the DCB test specimen is taken out from the test vessel.

A pin is inserted into a hole formed in the tip of the arms of each DCB test specimen that is taken out and a notch portion is opened with a tensile testing machine, and a wedge releasing stress P is measured. In addition, the notch in the DCB test specimen is released in liquid nitrogen, and a crack propagation length "a" with respect to crack propagation that occurred during immersion is measured. The crack propagation length "a" is measured visually using vernier calipers. A fracture toughness value $K_{ISSC}$ (MPa$\sqrt{m}$)

is determined using Formula (6) based on the obtained wedge releasing stress P and the crack propagation length "a".

$$K_{ISSC} = \frac{Pa\left(2\sqrt{3} + 2.38\frac{h}{a}\right)\left(\frac{B}{Bn}\right)^{\frac{1}{\sqrt{3}}}}{Bh^{\frac{3}{2}}} \quad (6)$$

In Formula (6), h represents the height (mm) of each arm of the DCB test specimen, B represents the thickness (mm) of the DCB test specimen, and Bn represents the web thickness (mm) of the DCB test specimen. These are defined in "Method D" of NACE TM0177-2005.

In the steel pipe according to the present embodiment, the fracture toughness value $K_{ISSC}$ of determined under the DCB test is 30.0 MPa√m or more. Further, in the steel pipe according to the present embodiment, in a case where the tensile yield strength in the axial direction is in a range of 862 to less than 965 MPa (125 ksi grade), the fracture toughness value $K_{ISSC}$ of determined under the DCB test is 35.0 MPa√m or more.

In the constant load tensile test, a mixed aqueous solution containing 5.0 mass % of sodium chloride and 0.4 mass % of sodium acetate that is adjusted to pH 3.5 using acetic acid (NACE solution B) is employed as the test solution. Round bar test specimens are taken from a center portion of the wall thickness of a steel pipe according to the present embodiment. The size of the round bar test specimen is, for example, 6.35 mm in diameter, with a parallel portion length of 25.4 mm. Note that the axial direction of the round bar test specimen is parallel to the axial direction of the steel pipe.

A stress is applied to the round bar test specimen. In a case where the tensile yield strength in the axial direction is in a range of 862 to less than 965 MPa (125 ksi grade), stress (776 MPa) corresponding to 90% of 125 ksi (862 MPa) is applied. In a case where the tensile yield strength in the axial direction is in a range of 965 to 1069 MPa (140 ksi grade), stress (869 MPa) corresponding to 90% of 140 ksi (965 MPa) is applied.

The test solution at 24° C. is poured into a test vessel so that the round bar test specimen to which the stress has been applied is immersed therein, and this is adopted as a test bath. After degassing the test bath, a mixed gas of 0.1 atm of $H_2S$ and 0.9 atm of $CO_2$ is blown into the test vessel to make the test bath a corrosive environment. The test bath in which the round bar test specimen is immersed is held at 24° C. for 720 hours. In the steel pipe according to the present embodiment, cracking is not confirmed after 720 hours elapse at a condition of the aforementioned constant load tensile test. Note that, in the present description, the statement "cracking is not confirmed" means that cracking is not confirmed in a case where the test specimen after the test was observed by the naked eye.

[Production Method]

The method for producing a steel pipe according to the present embodiment includes a preparation process, a quenching process, a tempering process, a hot straightening process, a hollow shell temperature adjustment process, and a rapid cooling process. The preparation process may include a starting material preparation process and a hot working process. In the present embodiment, a method for producing a seamless steel pipe will be described as one example of a method for producing a steel pipe. The method for producing a seamless steel pipe includes a process of preparing a hollow shell (preparation process), a process of subjecting the hollow shell to quenching and tempering (quenching process and tempering process), a hot straightening process, a hollow shell temperature adjustment process, and a rapid cooling process. Each of these processes is described in detail hereunder.

[Preparation Process]

In the preparation process, a hollow shell containing the aforementioned chemical composition is prepared. The method for producing the hollow shell is not particularly limited as long as the hollow shell contains the aforementioned chemical composition.

The preparation process may preferably include a process in which a starting material is prepared (starting material preparation process), and a process in which the starting material is subjected to hot working to produce a hollow shell (hot working process). Hereunder, a case in which the preparation process includes the starting material preparation process and the hot working process is described in detail.

[Starting Material Preparation Process]

In the starting material preparation process, a starting material is produced using molten steel containing the aforementioned chemical composition. The method for producing the starting material is not particularly limited, and a well-known method can be used. Specifically, a cast piece (a slab, bloom or billet) is produced by a continuous casting process using the molten steel. An ingot may also be produced by an ingot-making process using the molten steel. As necessary, the slab, bloom or ingot may be subjected to blooming to produce a billet. The starting material (a slab, bloom or billet) is produced by the above described process.

[Hot Working Process]

In the hot working process, the starting material that was prepared is subjected to hot working to produce a hollow shell. First, the billet is heated in a heating furnace. Although the heating temperature is not particularly limited, for example, the heating temperature is within a range of 1100 to 1300° C. The billet that is extracted from the heating furnace is subjected to hot working to produce a hollow shell (seamless steel pipe). The method of hot working is not particularly limited, and a well-known method can be used.

For example, the Mannesmann process may be performed as the hot working to produce the hollow shell. In this case, a round billet is piercing-rolled using a piercing machine. When performing piercing-rolling, although the piercing ratio is not particularly limited, the piercing ratio is, for example, within a range of 1.0 to 4.0. The round billet that underwent piercing-rolling is further hot-rolled to form a hollow shell using a mandrel mill, a reducer, a sizing mill or the like. The cumulative reduction of area in the hot working process is, for example, 20 to 70%.

A hollow shell may also be produced from the billet by another hot working method. For example, in the case of a heavy-wall steel pipe of a short length such as a coupling, a hollow shell may be produced by forging such as Ehrhardt process. A hollow shell is produced by the above process. Although not particularly limited, the wall thickness of the hollow shell is, for example, 9 to 60 mm.

The hollow shell produced by hot working may be air-cooled (as-rolled). The hollow shell produced by hot working may be subjected to direct quenching after hot working without being cooled to normal temperature, or may be subjected to quenching after undergoing supplementary heating (reheating) after hot working.

In a case of performing direct quenching or quenching after supplementary heating, it is preferable to stop the cooling midway through the quenching process and conduct slow cooling. In this case, quenching cracking can be suppressed. In a case where direct quenching is performed after hot working, or quenching is performed after supplementary heating after hot working, for the purpose of eliminating residual stress, a stress relief treatment (SR treatment) may be performed at a time that is after quenching and before the heat treatment of the next process. In this case, a residual stress of the hollow shell can eliminate.

As described above, a hollow shell is prepared in the preparation process. The hollow shell may be produced by the aforementioned preferable process, or may be a hollow shell that was produced by a third party, or a hollow shell that was produced in another factory other than the factory in which a quenching process and a tempering process that are described later are performed, or at a different works. The quenching process is described in detail hereunder.

[Quenching Process]

In the quenching process, the hollow shell that was prepared is subjected to quenching. As described above, the term "quenching" as used in the present description means rapidly cooling the hollow shell which has been heated to a temperature not less than the $A_3$ point. A quenching temperature is 800 to 1000° C. in the quenching process of the present embodiment.

In a case where direct quenching is performed after hot working, the quenching temperature corresponds to the surface temperature of the hollow shell that is measured by a thermometer placed on the exit side of the apparatus that performs the final hot working. Further, in a case where quenching is performed after supplementary heating or reheating is performed after hot working, the quenching temperature corresponds to the temperature of the furnace that performs the supplementary heating or reheating.

The quenching method, for example, continuously cools the hollow shell from the quenching starting temperature, and continuously decreases the temperature of the hollow shell. The method of performing the continuous cooling treatment is not particularly limited and a well-known method can be used. The method of performing the continuous cooling treatment is, for example, a method that cools the hollow shell by immersing the hollow shell in a water bath, or a method that cools the hollow shell in an accelerated manner by shower water cooling or mist cooling.

If the cooling rate during quenching is too slow, the microstructure does not become one that is principally composed of martensite and bainite, and the mechanical property defined in the present embodiment is not obtained. Therefore, as described above, in the method for producing the steel pipe according to the present embodiment, the hollow shell is rapidly cooled during quenching. Specifically, in the quenching process, the average cooling rate when the temperature of the hollow shell is within the range of 800 to 500° C. during quenching is defined as a cooling rate during quenching $CR_{800\text{-}500}$.

The cooling rate during quenching $CR_{800\text{-}500}$ is determined from the temperature measured at a region which is cooled most slowly in a section of the hollow shell to be quenched (for example, a center portion of the wall thickness of the hollow shell when the outer surface and the inner surface of the hollow shell are forcibly cooled).

In the quenching process of the present embodiment, the cooling rate during quenching $CR_{800\text{-}500}$ is 120° C./min or more. A preferable lower limit of the cooling rate during quenching $CR_{800\text{-}500}$ is 200° C./min, and more preferably is 300° C./min. Although an upper limit of the cooling rate during quenching $CR_{800\text{-}500}$ is not particularly defined, for example, the upper limit is 60000° C./min.

Preferably, quenching is performed after performing heating of the hollow shell in the austenite zone a plurality of times. In this case, the SSC resistance of the steel pipe further increases because austenite grains are refined prior to quenching. Heating in the austenite zone may be repeated a plurality of times by performing quenching a plurality of times, or heating in the austenite zone may be repeated a plurality of times by performing normalizing and quenching. Hereunder, the tempering process will be described in detail.

[Tempering Process]

In the tempering process, tempering is performed on the hollow shell which has been subjected to the aforementioned quenching. As described above, the term "tempering" as used in the present description means reheating and holding the hollow shell after quenching at a temperature less than the $A_{c1}$ point. The tempering temperature is appropriately adjusted in accordance with the chemical composition of the hollow shell and the yield strength in the axial direction of steel pipe to be obtained.

That is, the tempering temperature is adjusted for the hollow shell which contains a chemical composition of the present embodiment such that the yield strength in the axial direction of a steel pipe is in a range of 862 to 1069 MPa (125 to 155 ksi, that is, 125 ksi grade or 140 ksi grade), and the yield ratio in the axial direction of the steel pipe is 90% or more. Note that the tempering temperature means the temperature of the furnace for performing tempering.

In the tempering process of the present embodiment, the tempering temperature is 670° C. to the $A_{c1}$ point. If the tempering temperature is 670° C. or more, carbides are sufficiently spheroidized and the SSC resistance of the steel pipe is further increased.

In the tempering process of the present embodiment, the holding time at the tempering temperature (tempering time) is 10 to 180 minutes. If the tempering time is too short, carbides are not spheroidized sufficiently, thus the SSC resistance of steel pipe decreases. Also if the tempering time is too long, the aforementioned effect is saturated. Further, in comparison to other shapes, temperature variations with respect to the steel pipe are liable to occur during holding for tempering. Therefore, a preferable lower limit of the holding time for tempering is 15 minutes. Here, the tempering time (holding time) means the period of time from the inserting the intermediate steel material to the furnace till the extracting from the furnace.

A preferable upper limit of the tempering time is 90 minutes, more preferably is 70 minutes, and further preferably is 60 minutes. A person skilled in the art will be sufficiently capable of making the yield strength of the steel pipe containing the chemical composition of the present embodiment fall within the range of 862 to 1069 MPa (125 to 155 ksi, that is, 125 ksi grade or 140 ksi grade) by appropriately adjusting the aforementioned holding time at the aforementioned tempering temperature. Hereinafter, the hot straightening process will be described in detail.

[Hot Straightening Process]

In the hot straightening process, straightening in a warm condition (hot straightening) is conducted on the hollow shell which has been subjected to the aforementioned tempering. In the hot straightening process of the present embodiment, a temperature to start the hot straightening (hot straightening start temperature) is 600° C. to the tempering temperature. As described above, if the temperature to perform hot straightening is too low, excessive work hardening occurs, thus the SSC resistance of steel pipe decreases. In this case, the yield strength in the axial direction and/or the circumferential direction of steel pipe may become too high in some cases. For that reason, in the hot straightening process of the present embodiment, the hot straightening start temperature is set to 600° C. or more.

On the other hand, when the hot straightening start temperature is higher than the tempering temperature, supplementary heating becomes necessary. Therefore, in the hot straightening process of the present embodiment, the hot straightening start temperature is set to 600° C. to the tempering temperature. The hot straightening start temperature as used in the present description means a surface temperature of the hollow shell on inlet side of the straightening machine. The surface temperature of the hollow shell on inlet side of the straightening machine can be measured by a thermometer (for example, radiation thermometer) placed on the inlet side of the straightening machine.

As described above, the type of the straightening machine for performing the hot straightening is not particularly limited and a well-known straightening machine can be used. The straightening machine may be, for example, an inclined-roll type straightening machine (for example, a rotary straightener, etc.), or a rotary housing type straightening machine. That is, in the present embodiment, the hot straightening may be performed in a well-known method without any particular limitation.

The reduction rate in the hot straightening is, for example, 10 to 50%. A person skilled in the art in the oil-well steel pipe field can perform hot straightening on a steel pipe at an appropriate reduction rate, thereby improving the straightness in the axial direction of steel pipe, and/or the roundness of the sectional shape of steel pipe. Next, the hollow shell temperature adjustment process will be described.

[Hollow Shell Temperature Adjustment Process]

In the hollow shell temperature adjustment process, the temperature of the hollow shell is adjusted after conducting the aforementioned hot straightening process. In the hollow shell temperature adjustment process of the present embodiment, the temperature of the hollow shell is maintained in a range from the temperature of the hollow shell at the time of completion of the hot straightening to 500° C. for 10 to 120 seconds after the completion of the hot straightening.

In the present description, "maintaining the temperature of the hollow shell" may be performed by cooling the hollow shell at a cooling rate not more than air-cooling (air-cooling, slow-cooling, etc.) to keep the hollow shell temperature in a range from the temperature at the time of completion of the hot straightening to 500° C. Moreover, the hollow shell temperature may be kept in a range from the temperature at the time of completion of the hot straightening to 500° C. by heating the hollow shell using a supplementary heating furnace or a high-frequency heating furnace. In other words, in the hollow shell temperature adjustment process, the hollow shell may be air-cooled or slow-cooled, and also may be held or heated.

As described above, it is considered that the dislocation density of a hollow shell is increased by hot straightening. Therefore, in the method for producing a steel pipe according to the present embodiment, the temperature of the hollow shell is maintained after completion of the hot straightening until the rapid cooling to be described later is started. As a result of that, the difference between the tensile yield strength in the circumferential direction and the compressive yield strength in the circumferential direction is reduced. The present inventors consider this mechanism as follows.

Hot straightening induces anisotropy in the strength in the circumferential direction of the hollow shell. Specifically, the tensile yield strength in the circumferential direction of hollow shell is increased and the compressive yield strength in the circumferential direction is decreased. Where, when a dislocation is introduced by hot straightening, the newly introduced dislocation is a mobile dislocation. Therefore, it is considered that dissolved C adheres to the newly introduced mobile dislocation by maintaining the hollow shell at a warm condition after hot straightening. In this case, the Cottrell effect occurs in the hollow shell. As a result of that, both the tensile yield strength and the compressive yield strength in the circumferential direction of hollow shell increase. On the other hand, maintaining a hollow shell at a warm condition decreases the dislocation density of the hollow shell to some extent. As a result of such balance, the difference between the tensile yield strength and the compressive yield strength in the circumferential direction can be decreased.

Based on the mechanism described so far, if the time to maintain the temperature of the hollow shell (maintaining time) after completion of the hot straightening until the start of rapid cooling is too short, dislocations cannot be turned into sessile dislocations by dissolved C, and thus it is not possible to sufficiently improve the SSC resistance of steel pipe in some cases. On the other hand, if the maintaining time is too long, dissolved C may be precipitated as carbides. In this case, the amount of dissolved C becomes too low, the SSC resistance of steel pipe rather decreases. Therefore, in the hollow shell temperature adjustment process of the present embodiment, the maintaining time is 10 to 120 seconds.

The preferable lower limit of the maintaining time is 20 seconds. The preferable upper limit of the maintaining time is 100 seconds.

Here, in the hollow shell temperature adjustment process of the present embodiment, the hollow shell temperature to be maintained (maintaining temperature) is within a range from the temperature of the hollow shell at time of completion of hot straightening to 500° C. If the maintaining temperature is too low, ε carbide may be precipitated. In this case, the SSC resistance of steel pipe will deteriorate. On the other hand, if the maintaining temperature is too high, in some cases the dislocation density of steel pipe may excessively decrease. In this case, the desired tensile yield strength in the axial direction cannot be obtained. Therefore, in the hollow shell temperature adjustment process of the present embodiment, the maintaining temperature is within a range from the temperature of the hollow shell at time of completion of hot straightening to 500° C.

In the present description, the term "maintaining temperature" means the surface temperature of hollow shell in a range from the inlet side of a straightening machine to the inlet side of a rapid cooling facility which is used in the rapid cooling process to be described later. The surface temperature of hollow shell at the inlet side of the rapid cooling facility can be measured by, for example, a thermometer (for example, a radiation thermometer) placed at the inlet side of the rapid cooling facility. Next, the rapid cooling process will be described in detail.

[Rapid Cooling Process]

In the rapid cooling process, the hollow shell is cooled after conducting the aforementioned hollow shell temperature adjustment process. In the rapid cooling process of the present embodiment, the hollow shell is cooled at a cooling rate of 5 to 100° C./sec in a temperature range of the hollow shell of 500 to 200° C. The cooling rate after performing hot straightening was not controlled conventionally. However, from 500° C. to 200° C. is a temperature range in which diffusion of C is relatively fast. Therefore, if the cooling rate of the hollow shell after the hollow shell temperature adjustment process is slow, most of the dissolved C will be reprecipitated while temperature is decreasing.

That is, if the cooling rate of the hollow shell after the hollow shell temperature adjustment process is slow, the amount of dissolved C will become almost 0 mass %. Accordingly, in the present embodiment, the hollow shell after hot straightening is rapidly cooled. Specifically, in the rapid cooling process of the present embodiment, the hollow shell is cooled at a cooling rate of 5 to 100° C./sec in a temperature range of the hollow shell of 500 to 200° C.

Further, as described above, in the hollow shell temperature adjustment process of the present embodiment, the maintaining temperature is 500° C. or more. Therefore, in the rapid cooling process of the present embodiment, rapid cooling is started from 500° C. or more. On the other hand, as described above, if the maintaining temperature is too low, ε carbide is precipitated in some cases. Therefore, in the rapid cooling process of the present embodiment, rapid cooling is performed down to 200° C. or less. In other words, in the rapid cooling process of the present embodiment, a cooling start temperature is 500° C. or more, and further a cooling stop temperature is 200° C. or less.

Therefore, in the rapid cooling process of the present embodiment, the temperature range in which rapid cooling is performed at least includes a range of 500 to 200° C. Accordingly, in the present description, an average cooling rate in a rapid cooling process from the cooling start temperature to the cooling stop temperature is defined as a rapid-cooling-process cooling rate $CR_{500-200}$.

In the present embodiment, the rapid-cooling-process cooling rate $CR_{500-200}$ is 5 to 100° C./sec. If the rapid-cooling-process cooling rate $CR_{500-200}$ of the present embodiment is set to 5 to 100° C./sec, it is possible to perform cooling at a cooling rate of 5 to 100° C./sec over a range of 500° C. or more to 200° C. or less. As a result of that, the amount of dissolved C of the steel pipe of the present embodiment will be 0.010 to 0.060 mass %.

Therefore, in the present embodiment, the rapid-cooling-process cooling rate $CR_{500-200}$ is 5 to 100° C./sec. The preferable lower limit of the rapid-cooling-process cooling rate $CR_{500-200}$ is 10° C./sec, and more preferably is 15° C./sec. A preferable upper limit of the rapid-cooling-process cooling rate $CR_{500-200}$ is 75° C./sec, and more preferably is 50° C./sec.

In the present embodiment, a method for cooling so that the rapid-cooling-process cooling rate $CR_{500-200}$ is within the range of 5 to 100° C./sec is not particularly limited, and a well-known method can be used. The cooling method, for example, is a method that performs forced cooling of a hollow shell continuously from 500° C. or more to thereby continuously decrease the temperature of the hollow shell. Examples of this kind of continuous cooling treatment include a method that cools the hollow shell by immersion in a water bath or an oil bath, and a method that cools the hollow shell in an accelerated manner by shower water cooling, mist cooling or forced air cooling. Here, the facility for conducting the continuous cooling treatment is also referred to as a "rapid cooling facility".

Note that the rapid-cooling-process cooling rate $CR_{500-200}$ can be determined based on the surface temperature of the hollow shell at the inlet side and outlet side of the rapid cooling facility. Here, the surface temperature of the hollow shell at the inlet side of the rapid cooling facility (cooling start temperature) can be measured by a thermometer (for example, radiation thermometer) placed at the inlet side of the rapid cooling facility. The surface temperature of the hollow shell at the outlet side of the rapid cooling facility (cooling stop temperature) can be measured by a thermometer (for example, radiation thermometer) placed at the outlet side of the rapid cooling facility, for example.

A method for producing a seamless steel pipe has been described as one example of the aforementioned production method. However, the steel pipe according to the present embodiment may be another shape. The method for producing other shapes also includes, like the above described production method, for example, a preparation process, a quenching process, a tempering process, a hot straightening process, a hollow shell temperature adjustment process, and a rapid cooling process. However, the aforementioned production method is one example, and the steel pipe according to the present embodiment may be produced by another production method.

EXAMPLES

Molten steels containing the chemical compositions shown in Table 4 were produced.

TABLE 4

| Test Number | Chemical Composition (in the unit of mass %, the balance being Fe and impurities) | | | | | | | | | | |
|---|---|---|---|---|---|---|---|---|---|---|---|
| | C | Si | Mn | P | S | Al | Cr | Mo | Ti | N | O |
| 1 | 0.53 | 0.32 | 0.52 | 0.007 | 0.0006 | 0.035 | 0.43 | 1.33 | 0.006 | 0.0027 | 0.0012 |
| 2 | 0.51 | 0.30 | 0.45 | 0.011 | 0.0008 | 0.030 | 1.00 | 0.69 | 0.013 | 0.0035 | 0.0008 |
| 3 | 0.53 | 0.31 | 0.46 | 0.008 | 0.0013 | 0.040 | 1.00 | 1.70 | 0.014 | 0.0034 | 0.0008 |
| 4 | 0.56 | 0.28 | 0.38 | 0.009 | 0.0006 | 0.030 | 0.50 | 1.72 | 0.014 | 0.0034 | 0.0010 |
| 5 | 0.51 | 0.32 | 0.44 | 0.007 | 0.0005 | 0.036 | 0.50 | 1.20 | 0.013 | 0.0030 | 0.0013 |
| 6 | 0.51 | 0.31 | 0.41 | 0.010 | 0.0010 | 0.030 | 0.48 | 0.70 | 0.013 | 0.0038 | 0.0010 |
| 7 | 0.55 | 0.33 | 0.40 | 0.006 | 0.0007 | 0.035 | 0.30 | 2.00 | 0.014 | 0.0045 | 0.0006 |
| 8 | 0.56 | 0.30 | 0.43 | 0.007 | 0.0010 | 0.033 | 1.00 | 1.25 | 0.013 | 0.0034 | 0.0007 |
| 9 | 0.61 | 0.30 | 0.42 | 0.013 | 0.0006 | 0.035 | 1.00 | 0.80 | 0.007 | 0.0032 | 0.0011 |
| 10 | 0.52 | 0.25 | 0.36 | 0.007 | 0.0008 | 0.031 | 1.20 | 1.80 | 0.007 | 0.0038 | 0.0010 |
| 11 | 0.53 | 0.31 | 0.41 | 0.012 | 0.0010 | 0.031 | 0.65 | 1.20 | 0.007 | 0.0030 | 0.0013 |
| 12 | 0.56 | 0.30 | 0.44 | 0.010 | 0.0008 | 0.031 | 0.50 | 1.17 | 0.009 | 0.0030 | 0.0012 |
| 13 | 0.55 | 0.33 | 0.41 | 0.001 | 0.0004 | 0.031 | 1.10 | 1.15 | 0.010 | 0.0018 | 0.0012 |
| 14 | 0.51 | 0.26 | 0.43 | 0.008 | 0.0008 | 0.035 | 1.00 | 0.70 | 0.006 | 0.0040 | 0.0010 |
| 15 | 0.51 | 0.30 | 0.43 | 0.008 | 0.0006 | 0.032 | 0.56 | 1.77 | 0.008 | 0.0034 | 0.0008 |
| 16 | 0.51 | 0.34 | 0.49 | 0.012 | 0.0008 | 0.029 | 0.65 | 1.34 | 0.008 | 0.0032 | 0.0009 |
| 17 | 0.52 | 0.31 | 0.46 | 0.008 | 0.0013 | 0.051 | 0.95 | 1.71 | 0.014 | 0.0034 | 0.0008 |
| 18 | 0.52 | 0.34 | 0.43 | 0.008 | 0.0012 | 0.030 | 0.73 | 1.24 | 0.005 | 0.0033 | 0.0011 |

TABLE 4-continued

| | | | | | | | | | | |
|---|---|---|---|---|---|---|---|---|---|---|
| 19 | 0.68 | 0.28 | 0.44 | 0.011 | 0.0006 | 0.037 | 1.30 | 1.20 | 0.006 | 0.0048 | 0.0010 |
| 20 | 0.51 | 1.30 | 0.40 | 0.011 | 0.0010 | 0.036 | 0.52 | 0.77 | 0.006 | 0.0039 | 0.0014 |

| Test Number | Chemical Composition (in the unit of mass %, the balance being Fe and impurities) | | | | | | | | |
|---|---|---|---|---|---|---|---|---|---|
| | V | Nb | B | Ca | Mg | Zr | Co | W | Ni | Cu |
| 1 | — | — | — | — | — | — | — | — | — | — |
| 2 | 0.090 | — | — | — | — | — | — | — | — | — |
| 3 | 0.050 | 0.011 | — | — | — | — | — | — | — | — |
| 4 | — | 0.015 | — | 0.0008 | — | — | — | — | — | — |
| 5 | 0.100 | 0.012 | 0.0005 | 0.0016 | 0.0005 | — | — | — | — | — |
| 6 | 0.090 | 0.012 | — | 0.0012 | — | 0.0008 | — | — | — | — |
| 7 | — | 0.024 | — | — | — | — | 0.35 | — | — | — |
| 8 | 0.030 | 0.028 | 0.0006 | — | — | — | — | 0.25 | — | — |
| 9 | 0.100 | 0.027 | — | — | — | — | — | — | 0.15 | 0.15 |
| 10 | 0.060 | 0.017 | — | 0.0013 | — | — | 0.44 | — | — | — |
| 11 | 0.098 | 0.029 | — | — | — | — | 0.33 | 0.25 | — | — |
| 12 | 0.095 | 0.020 | 0.0005 | 0.0008 | 0.0005 | — | — | — | 0.03 | 0.03 |
| 13 | 0.040 | 0.018 | 0.0005 | 0.0015 | — | — | — | — | — | — |
| 14 | — | — | 0.0011 | — | — | — | — | — | — | — |
| 15 | — | 0.030 | — | 0.0008 | — | — | — | — | — | — |
| 16 | — | — | — | — | — | — | — | — | — | — |
| 17 | 0.060 | 0.012 | 0.0013 | — | — | — | — | — | — | — |
| 18 | — | — | — | — | — | — | — | — | — | — |
| 19 | 0.050 | 0.026 | 0.0013 | 0.0016 | — | — | — | — | — | — |
| 20 | 0.090 | 0.026 | 0.0013 | 0.0016 | — | — | — | — | — | — |

Ingots were produced using the aforementioned molten steels. The ingot was subjected to hot rolling (mandrel Mannesmann rolling) to produce a hollow shell (seamless steel pipe) having an outer diameter of 340 mm and a wall thickness of 13 mm.

The hollow shell of each test number after hot rolling was air-cooled such that the hollow shell has a normal temperature (25° C.).

After being air-cooled, the hollow shell of each test number was reheated such that the temperature of the hollow shell was a quenching temperature (900° C. at which an austenite single phase was obtained), and was held for 30 minutes. Where, the temperature of the furnace with which reheating was performed was set to the quenching temperature (C). After being held, the hollow shell was immersed in a water bath to be quenched. The cooling rate during quenching was determined from the temperature measured by a K thermocouple of a sheath-type which was inserted in advance into a center portion of the wall thickness of the hollow shell. The cooling rate during quenching ($CR_{800-500}$) of each test number was within the range of 120 to 6000° C./min.

After quenching, the hollow shells of each test number were subjected to tempering. In the tempering, the tempering temperature was adjusted so that the steel pipes became 125 ksi grade or 140 ksi grade as specified in the API standards (yield strength of 862 to 1069 MPa). The tempering temperature (° C.) and the tempering time (min) for the hollow shell of each test number are shown in Table 5. Where, the temperature of the furnace with which tempering was performed was supposed to be the tempering temperature (C). Note that any of the $A_{c1}$ points of the hollow shells of each test number was in a range of 730 to 750° C., and the tempering temperature was set to be lower than the $A_{c1}$ point.

TABLE 5

| Test Number | Tempering Temperature (° C.) | Tempering Time (min) | Hot straightening start temperature (° C.) | Maintaining time (sec) | Rapid-cooling-process start temperature (° C.) | Rapid-cooling-process cooling rate $CR_{500-200}$ (° C./sec) |
|---|---|---|---|---|---|---|
| 1 | 680 | 60 | 620 | 10 | 590 | 25 |
| 2 | 690 | 15 | 650 | 45 | 550 | 10 |
| 3 | 700 | 40 | 630 | 35 | 630 | 10 |
| 4 | 700 | 40 | 630 | 60 | 600 | 5 |
| 5 | 690 | 30 | 640 | 120 | 500 | 10 |
| 6 | 700 | 15 | 650 | 100 | 550 | 10 |
| 7 | 700 | 60 | 650 | 35 | 600 | 35 |
| 8 | 700 | 45 | 630 | 100 | 530 | 35 |
| 9 | 680 | 60 | 630 | 100 | 530 | 35 |
| 10 | 680 | 60 | 620 | 100 | 530 | 15 |
| 11 | 700 | 60 | 620 | 80 | 520 | 10 |
| 12 | 700 | 60 | 650 | 30 | 600 | 20 |
| 13 | 700 | 60 | 630 | 20 | 600 | 25 |
| 14 | 680 | 60 | 570 | 10 | 530 | 25 |
| 15 | 700 | 60 | 630 | 3 | 620 | 25 |
| 16 | 700 | 30 | 640 | 300 | 510 | 25 |
| 17 | 700 | 60 | 600 | 120 | 450 | 25 |

TABLE 5-continued

| Test Number | Tempering Temperature (° C.) | Tempering Time (min) | Hot straightening start temperature (° C.) | Maintaining time (sec) | Rapid-cooling-process start temperature (° C.) | Rapid-cooling-process cooling rate $CR_{500\text{-}200}$ (° C./sec) |
|---|---|---|---|---|---|---|
| 18 | 700 | 30 | 610 | 60 | 565 | 1 |
| 19 | 680 | 30 | 620 | 60 | 560 | 25 |
| 20 | 700 | 60 | 630 | 60 | 560 | 25 |

After being subjected to heat treatment at each tempering temperature, the hollow shell of each test number was subjected to hot straightening. The hot straightening was performed by an inclined-roll type straightening machine (a rotary straightener). The hot straightening start temperatures (° C.) in the hot straightening of the hollow shells of each test number are shown in Table 5. Note that the surface temperature of the hollow shell, which was measured by a radiation thermometer placed at the inlet side of the straightening machine for performing hot straightening, was adopted as the hot straightening start temperature (° C.).

The hollow shell of each test number which had been subjected to hot straightening was cooled. The cooling was performed by mist water from a ring-shaped tube in which 24 nozzles were disposed in the circumferential direction of the hollow shell. Hereinafter, the ring-shaped tube is referred to as a "rapid cooling facility". The rapid cooling facility was disposed at the outlet side of the straightening machine. The time to the start of rapid cooling after hot straightening (maintaining time) (sec) was adjusted by adjusting the timing of the spraying of water. Further, the surface temperature of the hollow shell of each test number was measured by a radiation thermometer placed at the inlet side of the rapid cooling facility and a radiation thermometer placed at the outlet side of the rapid cooling facility.

From measured temperatures, the rapid-cooling-process cooling rate $CR_{500\text{-}200}$ (° C./sec) was determined for the hollow shell of each test number. The maintaining time (sec), the rapid-cooling-process start temperature (° C.), and the rapid-cooling-process cooling rate $CR_{500\text{-}200}$ (° C./sec) are shown in Table 5. Note that the surface temperature of the hollow shell measured by the radiation thermometer placed at the inlet side of the rapid cooling facility was adopted as the rapid-cooling-process start temperature (° C.).

[Evaluation Test]

The steel pipe of each test number other than Test Number 19, which had been cooled after the aforementioned hot straightening, was subjected to a tensile test in the axial direction, a tensile test and a compression test in the circumferential direction, a measurement test of the amount of dissolved C, a microstructure observation, a DCB test, and a constant load tensile test as described below. Note that for Test Number 19, since a crack occurred while hot straightening was performed, the evaluation test could not be conducted.

[Tensile Test in Axial Direction]

A tensile test in axial direction was conducted in accordance with ASTM E8 (2013). Specifically, a round bar test specimen, which was 6.35 mm in the diameter of a parallel portion and 35 mm in the length of the parallel portion, was taken from a center portion of the wall thickness of a steel pipe of each test number. The axial direction of the round bar test specimen was parallel to the rolling direction (axial direction) of the steel pipe.

A tensile test was performed at normal temperature (25° C.) in the atmosphere using the round bar test specimen of each test number, and a yield strength (MPa) and a tensile strength (MPa) were obtained. Note that the 0.2% offset proof stress obtained in the tensile test was adopted as the yield strength (MPa) of each test number. A maximum stress during uniform elongation was taken as the tensile strength (MPa). A ratio of a determined yield strength (YS) to a tensile strength (TS) was adopted as a yield ratio (YR) (%). Thus determined YS (MPa), TS (MPa), and YR (%) are shown in Table 6.

TABLE 6

| Test Number | YS (MPa) | TS (MPa) | YR (%) | Circumferential tensile YS (MPa) | Circumferential compressive YS (MPa) | Tensile YS - compressive YS (MPa) | Amount of dissolved C (mass %) | Number density of ε carbide particles (/μm³) | Constant load tensile test | SSC resistance $K_{1SSC}$ (MPa√m) 1 | 2 | 3 | Average value |
|---|---|---|---|---|---|---|---|---|---|---|---|---|---|
| 1 | 988 | 1055 | 94 | 1020 | 970 | 50 | 0.046 | 25 | E | 30.0 | 31.0 | 32.0 | 31.0 |
| 2 | 998 | 1070 | 93 | 1015 | 985 | 30 | 0.047 | 20 | E | 31.0 | 32.5 | 32.0 | 31.8 |
| 3 | 885 | 945 | 94 | 893 | 863 | 30 | 0.029 | 15 | E | 36.5 | 37.3 | 37.3 | 37.0 |
| 4 | 895 | 953 | 94 | 903 | 867 | 36 | 0.036 | 10 | E | 38.1 | 37.6 | 38.5 | 38.1 |
| 5 | 990 | 1045 | 95 | 1010 | 975 | 35 | 0.031 | 20 | E | 32.2 | 31.0 | 30,0 | 31,1 |
| 6 | 995 | 1067 | 93 | 1023 | 975 | 48 | 0.045 | 15 | E | 33.2 | 33.2 | 32.0 | 32.8 |
| 7 | 875 | 932 | 94 | 895 | 865 | 30 | 0.038 | 25 | E | 38.1 | 38.3 | 37.2 | 37.9 |
| 8 | 905 | 970 | 93 | 920 | 885 | 35 | 0.044 | 20 | E | 39.1 | 38.5 | 38.3 | 38.6 |
| 9 | 966 | 1033 | 94 | 996 | 966 | 30 | 0.045 | 18 | E. | 32.3 | 32.1 | 33.6 | 32.7 |
| 10 | 1000 | 1062 | 94 | 1013 | 980 | 33 | 0.023 | 23 | E | 30.3 | 31.0 | 31.0 | 30.8 |
| 11 | 915 | 992 | 92 | 930 | 885 | 45 | 0,045 | 22 | E | 35.8 | 36.7 | 36.2 | 36.2 |
| 12 | 888 | 945 | 94 | 920 | 885 | 35 | 0.042 | 10 | E | 36.8 | 39.2 | 38.3 | 38.1 |
| 13 | 892 | 943 | 95 | 915 | 865 | 50 | 0.041 | 10 | E | 36.8 | 38.6 | 38.0 | 37.8 |

TABLE 6-continued

| Test Number | YS (MPa) | TS (MPa) | YR (%) | Circum-ferential tensile YS (MPa) | Circum-ferential compressive YS (MPa) | Tensile YS - compressive YS (MPa) | Amount of dissolved C (mass %) | Number density of ε carbide particles (/μm³) | SSC resistance Constant load tensile test | $K_{ISSC}$ (MPa√m) 1 | 2 | 3 | Average value |
|---|---|---|---|---|---|---|---|---|---|---|---|---|---|
| 14 | 1070 | 1115 | 96 | 1078 | 1025 | 53 | 0.040 | 20 | NA | 18.3 | 19.5 | 16.8 | 18.2 |
| 15 | 892 | 944 | 95 | 915 | 810 | 105 | 0.028 | 20 | NA | 37.8 | 38.1 | 37.2 | 37.7 |
| 16 | 888 | 945 | 94 | 910 | 880 | 30 | 0.003 | 15 | NA | 26.5 | 24.5 | 23.5 | 24.8 |
| 17 | 863 | 925 | 93 | 897 | 867 | 30 | 0.003 | 47 | NA | 23.2 | 24.3 | 23.3 | 23.6 |
| 18 | 885 | 950 | 93 | 905 | 875 | 30 | 0.005 | 50 | NA | 27.0 | 25.0 | 26.5 | 26.2 |
| 19 | No evaluation possible due to cracks during hot straightening | | | | | | | | | | | | |
| 20 | 865 | 932 | 93 | 900 | 870 | 30 | 0.044 | 15 | NA | 27.0 | 23.0 | 25.0 | 25.0 |

[Tensile Test and Compression Test in the Circumferential Direction]

A tensile test in the circumferential direction is conducted in accordance with ASTM E8 (2013) as in the tensile test in the axial direction. Specifically, a round bar test specimen, which was 6.35 mm in the diameter of a parallel portion and 35 mm in the length of the parallel portion, was taken from a center portion of the wall thickness of a steel pipe of each test number. The round bar test specimen was taken such that the axial direction of the round bar test specimen and the circumferential direction of the steel pipe are parallel to each other in a center portion of the round bar test specimen.

A tensile test was conducted at normal temperature (25° C.) in the atmosphere using the round bar test specimen of each test number, and a tensile yield strength (MPa) in the circumferential direction was obtained. Note that as described above, the 0.2% offset proof stress obtained by the tensile test was adopted as the tensile yield strength (MPa) in the circumferential direction of each test number.

The compression test in the circumferential direction was conducted in the following way. A round bar test specimen, which was 6.35 mm in the diameter of a parallel portion and 35 mm in the length of the parallel portion, was taken from a center portion of the wall thickness of a steel pipe of each test number. The round bar test specimen was taken such that the axial direction of the round bar test specimen and the circumferential direction of the steel pipe are parallel to each other in a center portion of the round bar test specimen.

A compression test was conducted at normal temperature (25° C.) in the atmosphere using the round bar test specimen of each test number, and a compressive yield strength (MPa) in the circumferential direction was obtained. Note that as described above, the 0.2% offset proof stress obtained by the compression test was adopted as the compressive yield strength (MPa) in the circumferential direction of each test number.

Thus determined the tensile yield strength in the circumferential direction (circumferential tensile YS) (MPa), the compressive yield strength in the circumferential direction (circumferential compressive YS) (MPa), and a difference between the tensile yield strength and the compressive yield strength (tensile YS-compressive YS) (MPa) in the circumferential direction are shown in Table 6.

[Amount of Dissolved C Measurement Test]

With respect to the steel pipes of each test number, the amount of dissolved C (mass %) was measured and calculated by the measurement method described above. Note that, the TEM used was JEM-2010 manufactured by JEOL Ltd., the acceleration voltage was set to 200 kV. For the EDS point analysis the irradiation current was 2.56 nA, and measurement was performed for 60 seconds at each point. The observation regions for the TEM observation were 8 μm×8 μm, and observation was performed with respect to an arbitrary 10 visual fields. The residual amounts of each element and the concentrations of each element in cementite that were used to calculate the amount of dissolved C were as listed in Table 7.

TABLE 7

| Test Number | Residual Amount (mass %) | | | | | | | Concentration In Cementite (mass %) | | | | Dissolved C Amount |
|---|---|---|---|---|---|---|---|---|---|---|---|---|
| | Fe | Cr | Mn | Mo | Ti | V | Nb | Fe | Cr | Mn | Mo | (mass %) |
| 1 | 4.9 | 0.30 | 0.15 | 0.95 | 0.006 | — | — | 88.1 | 5.5 | 2.1 | 4.3 | 0.046 |
| 2 | 5.1 | 0.75 | 0.13 | 0.30 | 0.013 | 0.090 | — | 80.5 | 10.2 | 3.9 | 5.4 | 0.047 |
| 3 | 4.0 | 0.67 | 0.12 | 1.23 | 0.014 | 0.050 | 0.011 | 82.6 | 11.1 | 3.1 | 3.2 | 0.029 |
| 4 | 4.7 | 0.33 | 0.12 | 1.36 | 0.014 | — | 0.015 | 88.2 | 4.6 | 3.0 | 4.2 | 0.036 |
| 5 | 4.8 | 0.32 | 0.10 | 0.81 | 0.013 | 0.080 | 0.011 | 87.4 | 5.7 | 2.9 | 4.0 | 0.031 |
| 6 | 5.2 | 0.40 | 0.11 | 0.45 | 0.013 | 0.090 | 0.012 | 88.3 | 3.7 | 3.0 | 5.0 | 0.045 |
| 7 | 4.4 | 0.15 | 0.09 | 1.60 | 0.013 | — | 0.025 | 88.9 | 2.6 | 2.5 | 6.0 | 0.038 |
| 8 | 5.0 | 0.68 | 0.09 | 0.93 | 0.012 | 0.020 | 0.028 | 80.1 | 12.3 | 2.6 | 5.0 | 0.044 |
| 9 | 6.4 | 0.45 | 0.11 | 0.60 | 0.007 | 0.082 | 0.030 | 80.3 | 11.3 | 2.8 | 5.6 | 0.045 |
| 10 | 4.5 | 0.60 | 0.20 | 1.00 | 0.007 | 0.080 | 0.017 | 78.1 | 12.1 | 2.9 | 6.9 | 0.023 |
| 11 | 5.0 | 0.30 | 0.11 | 0.80 | 0.007 | 0.080 | 0.028 | 83.7 | 7.9 | 2.9 | 5.5 | 0.045 |
| 12 | 5.6 | 0.22 | 0.11 | 0.75 | 0.009 | 0.083 | 0.018 | 84.7 | 8.1 | 2.6 | 4.6 | 0.042 |
| 13 | 5.5 | 0.60 | 0.08 | 0.65 | 0.010 | 0.030 | 0.017 | 81.3 | 11.1 | 2.6 | 5.0 | 0.041 |
| 14 | 5.6 | 0.51 | 0.11 | 0.35 | 0.006 | — | — | 85.7 | 7.3 | 2.9 | 4.1 | 0.040 |
| 15 | 4.6 | 0.24 | 0.10 | 1.20 | 0.012 | — | 0.030 | 82.4 | 8.0 | 3.3 | 6.3 | 0.028 |
| 16 | 5.1 | 0.45 | 0.17 | 0.95 | 0.008 | — | — | 84.2 | 8.4 | 2.6 | 4.8 | 0.003 |
| 17 | 4.4 | 0.50 | 0.09 | 1.30 | 0.014 | 0.060 | 0.012 | 76.1 | 16.1 | 2.8 | 5.0 | 0.003 |

TABLE 7-continued

| Test Number | ResidualAmount (mass %) | | | | | | | Concentration In Cementite (mass %) | | | | Dissolved C Amount (mass %) |
|---|---|---|---|---|---|---|---|---|---|---|---|---|
| | Fe | Cr | Mn | Mo | Ti | V | Nb | Fe | Cr | Mn | Mo | |
| 18 | 5.4 | 0.45 | 0.15 | 0.83 | 0.005 | — | — | 82.3 | 11.1 | 2.6 | 4.0 | 0.005 |
| 19 | 6.4 | 0.73 | 0.10 | 0.70 | 0.006 | 0.060 | 0.026 | 77.2 | 17.1 | 3.2 | 2.5 | 0.068 |
| 20 | 5.6 | 0.43 | 0.20 | 0.29 | 0.014 | 0.070 | 0.026 | 81.1 | 6.9 | 5.0 | 7.0 | 0.044 |

[Microstructure Observation]

For the microstructure of the steel pipe of each test number, it was determined that the total volume ratio of tempered martensite and tempered bainite was 90% or more since the yield strength was 862 to 1069 MPa (125 to 155 ksi, that is, 125 ksi grade or 140 ksi grade), and the yield ratio was 90% or more.

Further for steel pipes of each test number, the number density of F carbide particles was calculated by the aforementioned method. Note that TEM was JEM-2010 manufactured by JEOL Ltd. and the acceleration voltage was set to 200 kV. For the EDS point analysis the irradiation current was 2.56 nA, and measurement was performed for 60 seconds at each point. The observation regions for the TEM observation were 1 μm×1 μm, and observation was performed with respect to an arbitrary five visual fields. Thus determined number densities (/μm$^3$) of a carbide particles are shown in Table 6.

[DCB Test]

For steel pipes of each test number other than Test Number 19, a DCB test was conducted in accordance with "Method D" of NACE TM0177-2005. Specifically, three of the DCB test specimen illustrated in FIG. 3A were taken from a center portion of the wall thickness of the steel pipes of each test number. The DCB test specimens were taken in a manner such that the longitudinal direction of each DCB test specimen was parallel with the axial direction of the steel pipe. A wedge illustrated in FIG. 3B was further taken from the steel pipes of each test number. A thickness t of the wedge was 3.10 mm. The aforementioned wedge was driven into between the arms of the DCB test specimen.

A mixed aqueous solution containing 5.0 mass % of sodium chloride and 0.4 mass % of sodium acetate that had been adjusted to pH 3.5 using acetic acid (NACE solution B) was used as the test solution. The test solution was poured into the test vessel enclosing the DCB test specimen into which the wedge had been driven inside so as to leave a vapor phase portion, and was adopted as the test bath. After the test bath was degassed, a gaseous mixture consisting of 0.1 atm H$_2$S and 0.9 atm CO$_2$ was blown into the test vessel to make the test bath a corrosive environment. The inside of the test vessel was held at a temperature of 24° C. for 17 days (408 hours) while stirring the test bath. After being held for 408 hours, the DCB test specimen was taken out from the test vessel.

A pin was inserted into a hole formed in the tip of the arms of the DCB test specimen that was taken out and a notch portion was opened with a tensile testing machine, and a wedge releasing stress P was measured. In addition, the notch in the DCB test specimen being immersed in the test bath was released in liquid nitrogen, and a crack propagation length "a" with respect to crack propagation that occurred during immersion was measured. The crack propagation length "a" could be measured visually using vernier calipers. A fracture toughness value K$_{ISSC}$ (MPa m) was determined using Formula (6) based on the measured wedge releasing stress P and the crack propagation length "a". An arithmetic average value of obtained three fracture toughness values K$_{ISSC}$ (MPa√m) was determined and was defined as the fracture toughness value K$_{ISSC}$ (MPa√m) of the steel pipe of the test number.

$$K_{1SSC} = \frac{Pa\left(2\sqrt{3} + 2.38\frac{h}{a}\right)\left(\frac{B}{Bn}\right)^{-\frac{1}{\sqrt{3}}}}{Bh^{\frac{3}{2}}} \quad (6)$$

Note that in Formula (6), h (mm) represents a height of each arm of the DCB test specimen, B (mm) represents a thickness of the DCB test specimen, and Bn (mm) represents a web thickness of the DCB test specimen. These are defined in "Method D" of NACE TM0177-2005.

For the steel pipes of each test number, the obtained fracture toughness values K$_{ISSC}$ are shown in Table 6. When the fracture toughness value K$_{ISSC}$ as defined as described above was 30.0 MPa√m or more, it was determined that the result of the DCB test was good. Further, in a case where the tensile yield strength in the axial direction was 862 to less than 965 MPa (125 ksi grade), the result of the DCB test was even better if the fracture toughness value K$_{ISSC}$ as defined above was 35.0 MPa√m or more. Note that, the clearance between the arms when the wedge is driven in prior to immersion in the test bath influences the K$_{ISSC}$ value. Accordingly, actual measurement of the clearance between the arms was performed in advance using a micrometer, and it was confirmed that the clearance was within the range in the API standards.

[Constant Load Tensile Test]

For steel pipes of each test number other than Test Number 19, a constant load tensile test was conducted in a method in accordance with NACE TM0177-2005 Method A. Specifically, round bar test specimens having a diameter of 6.35 mm, and a length of 25.4 mm at the parallel portion were taken from a center portion of the wall thickness of the steel pipe of each test number. The axial direction of the round bar test specimen was parallel to the axial direction of the steel pipe. Tensile stress was applied in the axial direction of the round bar test specimen of each test number.

In this occasion, when the yield strength in the axial direction was 862 to less than 965 MPa (125 ksi grade), it was adjusted such that stress to be applied to the round bar test specimen of each test number was 90% of 125 ksi (862 MPa), that is, 776 MPa. When the yield strength in the axial direction was 965 to 1069 MPa (140 ksi grade), it was adjusted such that stress to be applied to the round bar test specimen of each test number was 90% of 140 ksi (965 MPa), that is, 869 MPa.

A mixed aqueous solution containing 5.0 mass % of sodium chloride and 0.4 mass % of sodium acetate that had been adjusted to pH 3.5 using acetic acid (NACE solution B) was used as the test solution. The test solution of 24° C. was poured into three test vessels, and these were adopted as test baths. The three round bar test specimens to which the stress was applied were immersed individually in mutually different test vessels as the test baths. After each test bath was degassed, a gaseous mixture consisting of 0.1 atm $H_2S$ and 0.9 atm $CO_2$ was blown into the respective test baths and caused to saturate. The test bath was held at 24° C. for 720 hours.

After being held for 720 hours, the round bar test specimens of each test number were observed to determine whether or not sulfide stress cracking (SSC) had occurred. Steel pipes for which cracking was not confirmed in all three of the round bar test specimens as the result of the observation were determined as being "E" (Excellent). On the other hand, steel pipes for which cracking was confirmed in at least one round bar test specimen were determined as being "NA" (Not Acceptable).

[Test Results]

The test results are shown in Table 6.

Referring to Tables 4 to 6, for the steel pipes of Test Numbers 1 to 13, the chemical composition was appropriate, the yield strength in the axial direction was 862 to 1069 MPa (125 ksi grade or 140 ksi grade), and the yield ratio was 90% or more. Further, the tensile yield strength in the circumferential direction was 862 to 1069 MPa, and the tensile yield strength in the circumferential direction was 30 to 80 MPa higher than the compressive yield strength in the circumferential direction. Further, the amount of dissolved C was 0.010 to 0.060 mass %. Furthermore, the number density of ε carbide particles was $30/\mu m^3$ or less. As a result, $K_{ISSC}$ value was 30.0 MPa√m or more, and cracking was not confirmed in all three of the test specimens in the constant load tensile test. In other words, excellent SSC resistance was exhibited.

In the steel pipes of Test Numbers 3, 4, 7, 8, and 11 to 13, the yield strength in the axial direction was 862 to less than 965 MPa (125 ksi grade). As a result, $K_{ISSC}$ was 35.0 MPa√m or more. In other words, further excellent SSC resistance was exhibited.

On the other hand, in the steel pipe of Test Number 14, the hot straightening start temperature was too low. For that reason, both the tensile yield strength in the axial direction and the tensile yield strength in the circumferential direction were more than 1069 MPa. As a result, $K_{ISSC}$ value was less than 30.0 MPa√m, and further cracking was confirmed in the constant load tensile test. In other words, excellent SSC resistance was not exhibited.

In the steel pipe of Test Number 15, the maintaining time after the hot straightening was too short. For that reason, the tensile yield strength in the circumferential direction was more than 80 MPa higher than the compressive yield strength in the circumferential direction. As a result, cracking was confirmed in the constant load tensile test. In other words, excellent SSC resistance was not exhibited.

In the steel pipe of Test Number 16, the maintaining time after the hot straightening was too long. For that reason, the amount of dissolved C was less than 0.010%. As a result, $K_{ISSC}$ value was less than 30.0 MPa√m, and further cracking was confirmed in the constant load tensile test. That is, excellent SSC resistance was not exhibited.

In the steel pipe of Test Number 17, a rapid cooling start temperature after the hot straightening was too low. For that reason, the amount of dissolved C was less than 0.010%. Further, the number density of ε carbide particles was more than $30/\mu m^3$. As a result, $K_{ISSC}$ value was less than 30.0 MPa√m, and further cracking was confirmed in the constant load tensile test. That is, excellent SSC resistance was not exhibited.

In the steel pipe of Test Number 18, the rapid-cooling-process cooling rate $CR_{500-200}$ was too slow. For that reason, the amount of dissolved C was less than 0.010%. As a result, the $K_{ISSC}$ value was less than 30.0 MPa√m, and cracking was confirmed in the constant load tensile test. In other words, excellent SSC resistance was not exhibited.

In the steel pipe of Test Number 19, the C content was too high. For that reason, cracking occurred during hot straightening, and evaluation of each test was not possible.

In the steel pipe of Test Number 20, the Si content was too high. As a result, the $K_{ISSC}$ value was less than 30.0 MPa√m, and further the cracking was confirmed in the constant load tensile test. In other words, excellent SSC resistance was not exhibited.

An embodiment of the present invention has been described above. However, the embodiment described above is merely an example for implementing the present invention. Accordingly, the present invention is not limited to the above embodiment, and the above embodiment can be appropriately modified and performed within a range that does not deviate from the gist of the present invention.

INDUSTRIAL APPLICABILITY

The steel pipe according to the present invention is widely applicable to steel pipes to be utilized in a sour environment, and preferably can be utilized as a steel pipe for oil wells that is utilized in an oil well environment, and further preferably can be utilized as oil-well steel pipes, such as casing, tubing and line pipes.

The invention claimed is:
1. A steel pipe comprising:
a chemical composition consisting of, in mass %,
C: more than 0.50 to 0.65%,
Si: 0.05 to 0.50%,
Mn: 0.05 to 1.00%,
P: 0.025% or less,
S: 0.0050% or less,
Al: 0.005 to 0.100%,
Cr: 0.30 to 1.50%,
Mo: 0.25 to 3.00%,
Ti: 0.002 to 0.050%,
N: 0.0010 to 0.0100%,
O: 0.0030% or less,
V: 0 to 0.300%,
Nb: 0 to 0.100%,
B: 0 to 0.0030%,
Ca: 0 to 0.0100%,
Mg: 0 to 0.0100%,
Zr: 0 to 0.0100%,
Co: 0 to 1.00%,
W: 0 to 1.00%,
Ni: 0 to 0.50%,
Cu: 0 to 0.50%, and
with the balance being Fe and impurities,
an amount of dissolved C within a range of 0.010 to 0.060 mass %,
wherein
a tensile yield strength in an axial direction of the steel pipe is 862 to 1069 MPa and a yield ratio in the axial direction of the steel pipe is 90% or more,
a tensile yield strength in a circumferential direction of the steel pipe is 862 to 1069 MPa, and the tensile yield strength in the circumferential direction of the steel pipe is 30 to 80 MPa higher than a compressive yield strength in the circumferential direction of the steel pipe.

2. The steel pipe according to claim 1, wherein the chemical composition contains one or more types of element selected from the group consisting of:
V: 0.010 to 0.300%, and
Nb: 0.002 to 0.100%.

3. The steel pipe according to claim 1, wherein the chemical composition contains:
B: 0.0001 to 0.0030%.

4. The steel pipe according to claim 1, wherein the chemical composition contains one or more types of element selected from the group consisting of:
Ca: 0.0001 to 0.0100%,
Mg: 0.0001 to 0.0100%, and
Zr: 0.0001 to 0.0100%.

5. The steel pipe according to claim 1, wherein the chemical composition contains one or more types of element selected from the group consisting of:
Co: 0.02 to 1.00%, and
W: 0.02 to 1.00%.

6. The steel pipe according to claim 1, wherein the chemical composition contains one or more types of element selected from the group consisting of:
Ni: 0.02 to 0.50%, and
Cu: 0.01 to 0.50%.

7. The steel pipe according to claim 1, wherein the steel pipe is an oil-well steel pipe.

8. The steel pipe according to claim 1, wherein the steel pipe is a seamless steel pipe.

9. A method for producing the steel pipe according to claim 1, comprising:
a preparation process of preparing a hollow shell containing a chemical composition consisting of, in mass %, C: more than 0.50 to 0.65%, Si: 0.05 to 0.50%, Mn: 0.05 to 1.00%, P: 0.025% or less, S: 0.0050% or less, Al: 0.005 to 0.100%, Cr: 0.30 to 1.50%, Mo: 0.25 to 3.00%, Ti: 0.002 to 0.050%, N: 0.0010 to 0.0100%, O: 0.0030% or less, V: 0 to 0.300%, Nb: 0 to 0.100%, B: 0 to 0.0030%, Ca: 0 to 0.0100%, Mg: 0 to 0.0100%, Zr: 0 to 0.0100%, Co: 0 to 1.00%, W: 0 to 1.00%, Ni: 0 to 0.50%, Cu: 0 to 0.50%, and with the balance being Fe and impurities;

a quenching process of, after the preparation process, cooling the hollow shell that is at 800 to 1000° C. at a cooling rate of 120° C./min or more;

a tempering process of holding the hollow shell after the quenching process at a tempering temperature of 670° C. to $A_{c1}$ point for 10 to 180 minutes;

a hot straightening process of subjecting the hollow shell after the tempering process to hot straightening at a temperature of 600° C. to the tempering temperature;

a hollow shell temperature adjustment process of maintaining a temperature of the hollow shell within a range from the temperature of the hollow shell at the time of completion of the hot straightening to 500° C. for 10 to 120 seconds after the completion of the hot straightening; and a rapid cooling process of cooling the hollow shell after the hollow shell temperature adjustment process at a cooling rate of 5 to 100° C./sec in a temperature range of the hollow shell of 500 to 200° C.

10. The method for producing a steel pipe according to claim 9, wherein the preparation process includes:
a starting material preparation process of preparing a starting material containing a chemical composition according to claim 1, and
a hot working process of subjecting the starting material to hot working to produce the hollow shell.

* * * * *